(12) United States Patent
Cheng

(10) Patent No.: US 8,433,104 B2
(45) Date of Patent: Apr. 30, 2013

(54) IMAGE PROCESSING METHOD FOR BACKGROUND REMOVAL

(75) Inventor: Ting-Yuan Cheng, Taipei County (TW)

(73) Assignee: Primax Electronics Ltd., Neihu, Taipei (TW)

( * ) Notice: Subject to any disclaimer, the term of this patent is extended or adjusted under 35 U.S.C. 154(b) by 910 days.

(21) Appl. No.: 12/552,295

(22) Filed: Sep. 2, 2009

(65) Prior Publication Data

US 2010/0322515 A1 Dec. 23, 2010

(30) Foreign Application Priority Data

Jun. 19, 2009 (TW) .............................. 98120552 A

(51) Int. Cl.
*G06K 9/00* (2006.01)
(52) U.S. Cl.
USPC ........................... 382/117; 382/103; 382/257
(58) Field of Classification Search .................. None
See application file for complete search history.

(56) References Cited

U.S. PATENT DOCUMENTS

2007/0116356 A1* 5/2007 Gong et al. .................... 382/173
2009/0154807 A1* 6/2009 Rossato et al. ................ 382/173

* cited by examiner

*Primary Examiner* — Jason M Repko
*Assistant Examiner* — David Perlman
(74) *Attorney, Agent, or Firm* — Winston Hsu; Scott Margo

(57) ABSTRACT

An image processing method includes: receiving an input image; referring to a first threshold value to compare a reference background image and the input image to determine a first foreground image within the input image; referring to the first foreground image to determine a second foreground image, which is different from the first foreground image, within the input image; and referring to a second threshold value, which is different from the first foreground image, to compare the reference background image and the second foreground image to determine a third foreground image within the input image. In addition, when generating the foreground image, a shadow effect is removed via a shadow removal method according to the present invention, and a better output image can thereby be derived.

11 Claims, 20 Drawing Sheets

| | | | | | |
|---|---|---|---|---|---|
| $A_5 = 1$ | $A_{11} = 1$ | $A_{17} = -1$ | $A_{23} = 1$ | $A_{29} = -1$ | $A_{35} = 1$ |
| $A_4 = 1$ | $A_{10} = 1$ | $A_{16} = -1$ | $A_{22} = 1$ | $A_{28} = -1$ | $A_{34} = 1$ |
| $A_3 = -1$ | $A_9 = 1$ | $A_{15} = -1$ | $A_{21} = 1$ | $A_{27} = -1$ | $A_{33} = -1$ |
| $A_2 = 1$ | $A_8 = -1$ | $A_{14} = 1$ | $A_{20} = 1$ | $A_{26} = 1$ | $A_{32} = 1$ |
| $A_1 = -1$ | $A_7 = 1$ | $A_{13} = -1$ | $A_{19} = 1$ | $A_{25} = -1$ | $A_{31} = 1$ |
| $A_0 = 1$ | $A_6 = 1$ | $A_{12} = 1$ | $A_{18} = 1$ | $A_{24} = -1$ | $A_{30} = 1$ |

FIG. 13

IMAGE PROCESSING METHOD FOR BACKGROUND REMOVAL

BACKGROUND OF THE INVENTION

1. Field of the Invention

The present invention relates to an image processing technique for removing a background, and more particularly, to an image processing method for removing a background and a foreground shadow, and further for deriving a better background-removed image by using a shadow removal technique.

2. Description of the Prior Art

Background removal is usually adopted in image processing of monitors or for highly-confidential meetings; however, conventional background removal methods can only provide images with poor visual quality. In particular, for foreground object shadows and resolution of foreground object image edges, conventional background removal methods fail to generate images with clear visual quality. How to solve the aforementioned problems is still an issue to be conquered in this field.

SUMMARY OF THE INVENTION

It is therefore an objective of the present invention to provide image processing techniques for removing foreground shadows and backgrounds that provide images of high visual quality.

According to one embodiment of the present invention, an image processing method is provided. The image processing method comprises: receiving an input image; referring to a first threshold to compare a reference background and the input image to determine a first foreground image within the input image; determining a second foreground image which is within the input image and different from the first foreground image according to the first foreground image; and referring to a second threshold different from the first threshold to compare the reference ground and the second foreground image to determine a third foreground image within the input image.

According to another embodiment of the present invention, an image processing method is provided. The image processing method comprises: receiving a foreground image corresponding to an input image; detecting a shadow part of at least one object of the foreground image to generate a detection result according to a reference background corresponding to the input image; and determining a first foreground image of the input image according to the detecting result.

According to yet another embodiment of the present invention, an image processing method is provided. The image processing method comprises: receiving a foreground image corresponding to an input image; detecting an edge of at least one foreground object of the foreground image to generate a detection result; and determining a first foreground image of the input image according to the detection result.

According to the aforementioned embodiments, the present invention provides an image processing method which is capable of removing backgrounds and foreground shadows, and performing edge processing on the derived foreground image to acquire a better foreground image.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 13 is a diagram of luminance autocorrelation values according to the luminance values of all pixels in FIG. 12.

DETAILED DESCRIPTION

Figure 1:
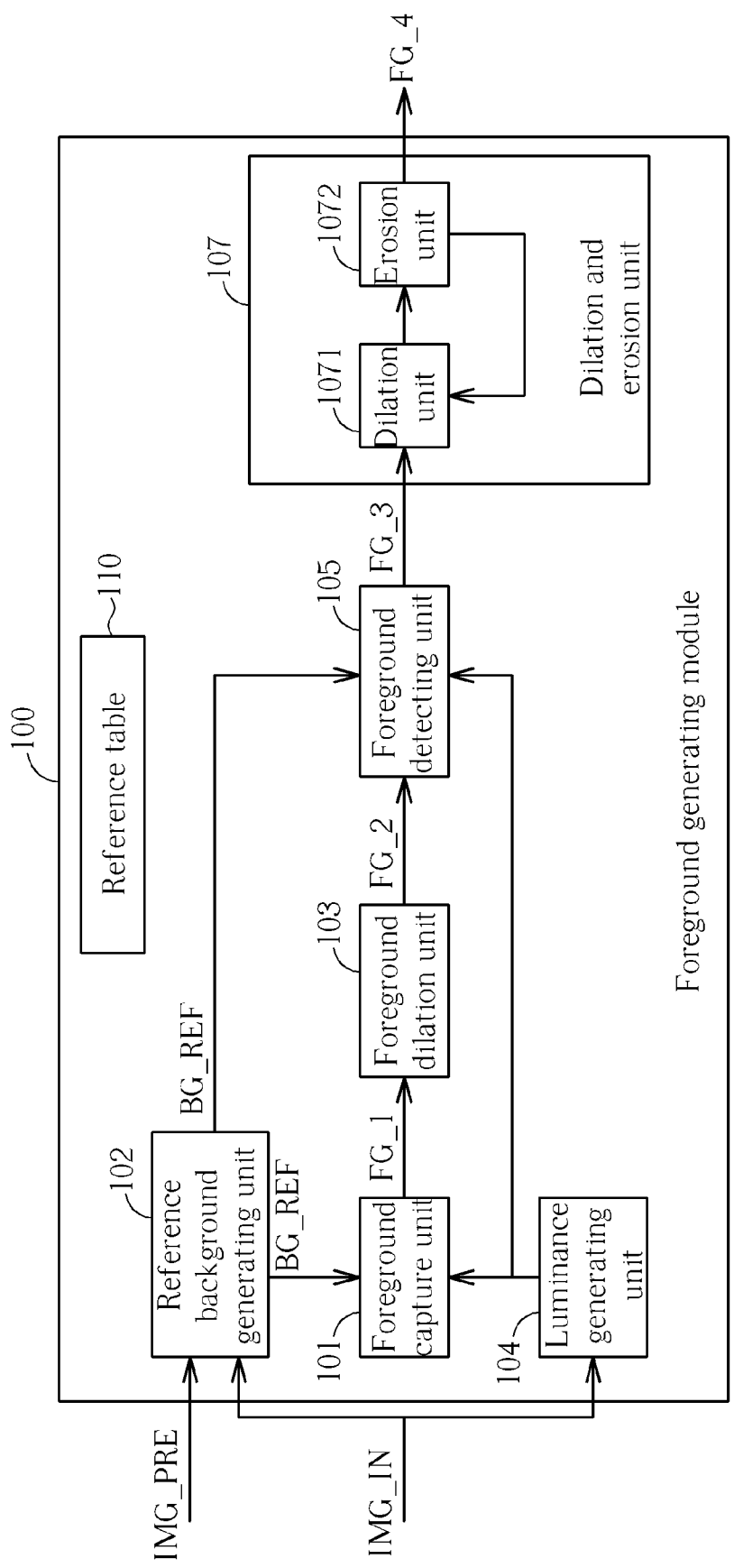
FIG. 1 is a diagram of a foreground generating module for deriving a foreground from an input image according to the present invention.

The present invention discloses a mechanism which is capable of deriving a foreground image from an input image successively. Please refer to FIG. 1, which is a diagram of a foreground generating module 100 for deriving a foreground from an input image according to the present invention. The foreground generating module 100 includes a foreground capture unit 101, a reference background generating unit 102, a luminance generating unit 104, a foreground dilation unit 103, a foreground detecting unit 105, a dilation and erosion unit 107 and a reference table 110, where internal components of the foreground generating module 100 can be implemented via physical circuits (hardware), program codes (software) or a combination thereof, and any image processing structure adopting an algorithm for deriving a foreground from an input image according to the present invention falls within the scope of the present invention. The reference background generating unit 102 generates a reference background BG_REF according to a default image IMG_PRE or an input image IMG_IN, wherein the reference ground BG_REF includes a plurality of processing units corresponding to a plurality of processing units of the input image IMG_IN, and each processing unit includes a plurality of pixels. The foreground capture unit 101 is coupled to the reference background generating unit 102 and luminance generating unit 104, and is for generating a first foreground image FG_1 according to the input image IMG_IN and reference background BG_REF.

The luminance generating unit 104 is coupled to the reference background generating unit 102 and the foreground capture unit 101, and is utilized for generating a plurality of luminance values associated with the input image IMG_IN and reference background BG_REF. The foreground dilation unit 103 is coupled to the foreground capture unit 101, and is for receiving the first foreground image FG_1 and adjusting the foreground image FG_1 as a second foreground image FG_2. The foreground detecting unit 105 is coupled to the foreground dilation unit 103, and is for receiving the second foreground image FG_2, and generating a third foreground image FG_3 according to the second foreground image and the reference background BG_REF. The dilation and erosion unit 107, which includes a dilation unit 1071 and an erosion unit 1072, is for receiving the third foreground image FG_3 and determining whether to output a processing result of the erosion unit 1072 as a fourth foreground image FG_4, wherein the dilation unit 1071, coupled to the foreground detection unit 105, is for receiving a foreground image and adjusting it to be a dilation foreground image; and the erosion unit 1072, coupled to the dilation 1072, is for receiving the dilation foreground image and adjusting it to be an erosion foreground image. The reference table 110 includes a plurality of storage units which correspond to a plurality of the input image IMG_IN (also corresponding to a plurality of reference ground BG_REF), and each storage unit is for storing a first code indicative of a foreground or a second code indicative of a background.

Figure 2:
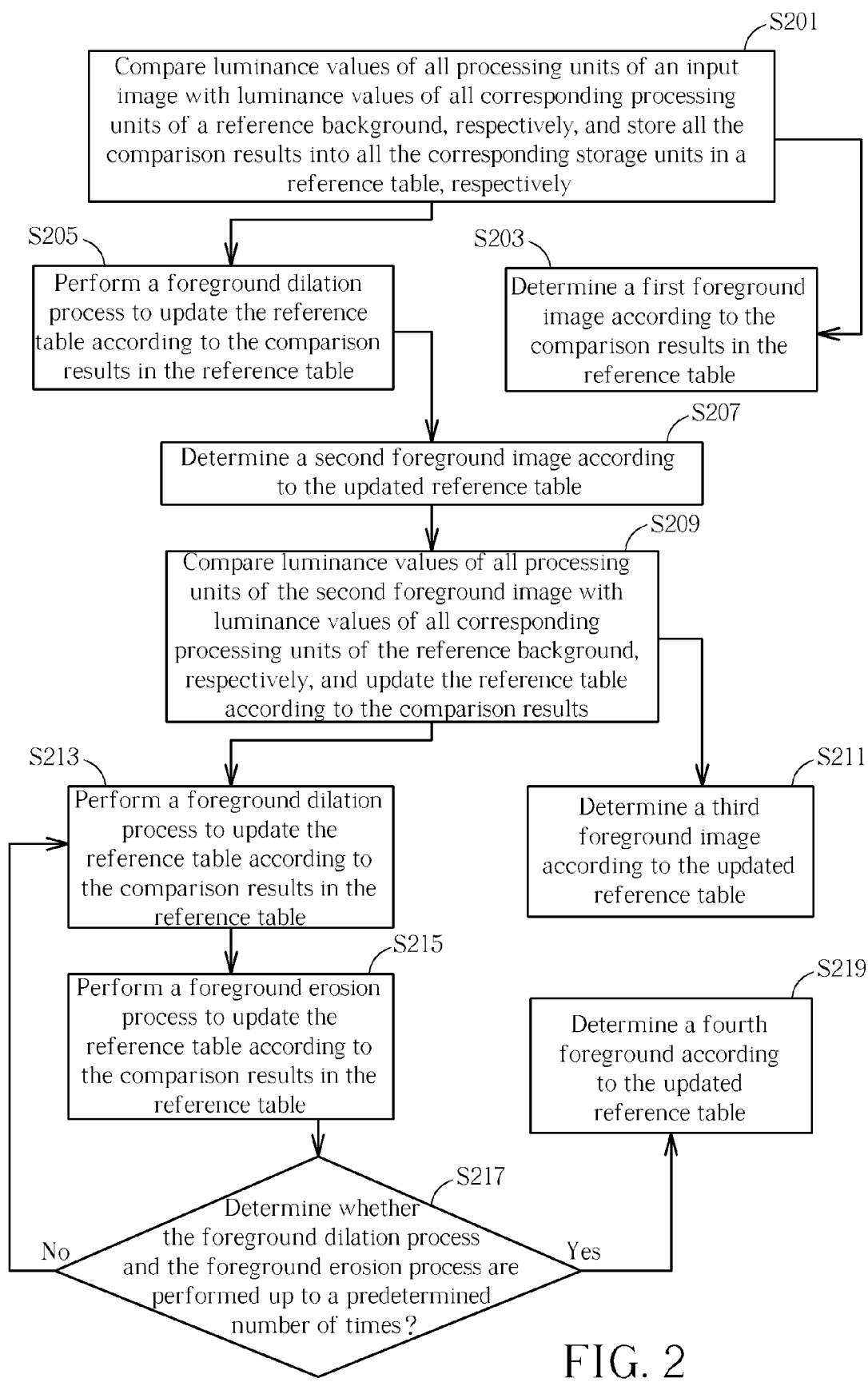
FIG. 2 is a flowchart of deriving a foreground image from an input image according to the present invention.

Please refer to FIG. 2 in conjunction with FIG. 1. FIG. 2 is a flowchart of deriving a foreground image from an input image IMG_IN according to the present invention. If the result is substantially the same, the steps are not required to be executed in the exact order shown in FIG. 2. In addition, the steps in FIG. 2 are not required to be executed sequentially, i.e., other steps can be inserted in between. The steps of deriving the foreground image from the input image are detailed as follows:

S201: Compare luminance values of all processing units of the input image IMG_IN with luminance values of all corresponding processing units of the reference background BG_REF, respectively, and store all the comparison results into all the corresponding storage units in the reference table 110, respectively;

S203: Determine a first foreground image FG_1 according to the comparison results in the reference table 110;

S205: Perform a foreground dilation process to update the reference table 110 according to the comparison results in the reference table 110;

S207: Determine a second foreground image FG_2 according to the updated reference table 110;

S209: Compare luminance values of all processing units of the second foreground image FG_2 with luminance values of all corresponding processing units of the reference background BG_REF, respectively, and update the reference table 110 according to the comparison results;

S211: Determine a third foreground image FG_3 according to the updated reference table 110;

S213: Perform a foreground dilation process to update the reference table 110 according to the comparison results in the reference table 110;

S215: Perform a foreground erosion process to update the reference table 110 according to the comparison results in the reference table 110;

S217: Determine whether the foreground dilation process and the foreground erosion process are performed up to predetermined cycle times or not. If the foreground dilation process and the foreground erosion process are performed up to the predetermined cycle times, go to step S219; otherwise go to step S213; and S219: Determine a fourth foreground FG_4 according to the updated reference table 110.

Figure 3:
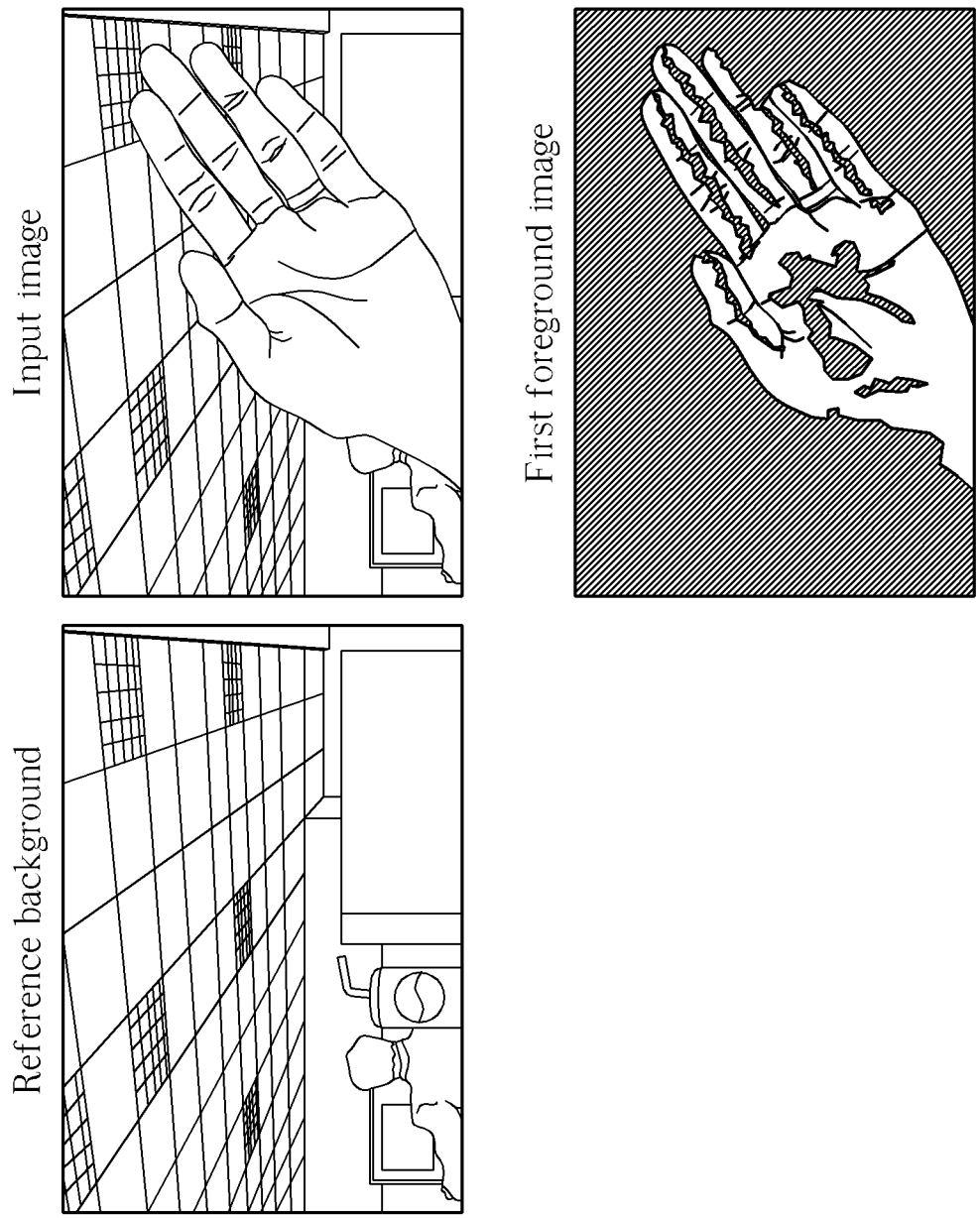
FIG. 3 is a diagram of a derived first foreground image, a corresponding reference background and an input image according to one embodiment of the present invention.

When a foreground object shows up in the reference ground BG_REF, since the pixel occupied by the foreground object is different from the pixel when the foreground object is absent, resulting in a huge difference in luminance, the foreground generating module 100 utilizes the luminance generating unit 104 to process the input image IMG_IN and the reference background BG_REF, respectively, after receiving the input image IMG_IN, to save on processing time. The luminance value of each processing unit in the input image IMG_IN and reference background BG_REF is usually based on a plurality of pixels which compose one processing unit (for example, the luminance value can be a sum or an average of all the pixels' luminance in one processing unit), and the foreground capture unit 101 will compare the luminance values of all processing units of the input image IMG_IN with luminance values of all corresponding processing units of the reference background BG_REF, respectively. If the difference between the luminance value of one processing unit of the input image IMG_IN and the luminance value of the corresponding processing unit of the reference background BG_REF is larger than or equal to a first threshold, the foreground capture unit 101 assigns a first code to a corresponding storage unit in the reference table 110; otherwise, the foreground capture unit 101 assigns a second code to a corresponding storage unit in the reference table 110 (step S201). Afterwards, the foreground capture unit 101 determines the first foreground image FG_1 according to each storage unit having the first code in the reference table 110, i.e., the foreground capture unit 101 only outputs the processing units corresponding to the first code in the input image IMG_IN to generate the first foreground image FG_1 as a preliminary result (step S203). Please refer to FIG. 3, which is a diagram of the derived first foreground image FG_1, the corresponding reference background and the input image IMG_IN according to one embodiment of the present invention. It can be seen from the figure that the aforementioned steps can successively derive a rough foreground processing result.

To derive a more elaborate foreground processing result, this embodiment further employs the foreground dilation unit 103 to perform a foreground dilation process according to the reference table 110 after receiving the first foreground image FG_1. The foreground dilation process includes the following steps: if a specific processing unit of the first foreground image FG_1, which corresponds to a specific storage unit, has an amount of neighboring processing units corresponding to the first code and located at the left side of the specific processing unit within a horizontal distance and an amount of neighboring processing units corresponding to the first code and located at the right side of the specific processing unit within the horizontal distance that are both greater than a horizontal threshold, the first code is assigned to the storage unit to replace the second code; after performing the horizontal dilation process, if the specific processing unit of the first foreground image, which corresponds to the specific storage unit, has an amount of neighboring processing units corresponding to the first code and located at the upper side of the specific processing within a vertical distance and an amount of neighboring processing units corresponding to the first code and located at the lower side of the specific processing within the vertical distance that are both greater than a vertical threshold, the first code is assigned to the storage unit to replace the second code (step S207). Please note that the sequence of the horizontal dilation process and the vertical dilation process is not limited to the exemplary order mentioned above. An alternative design of performing the vertical dilation process first and then performing the horizontal dilation process later also falls within the scope of the present invention.

Figure 4:
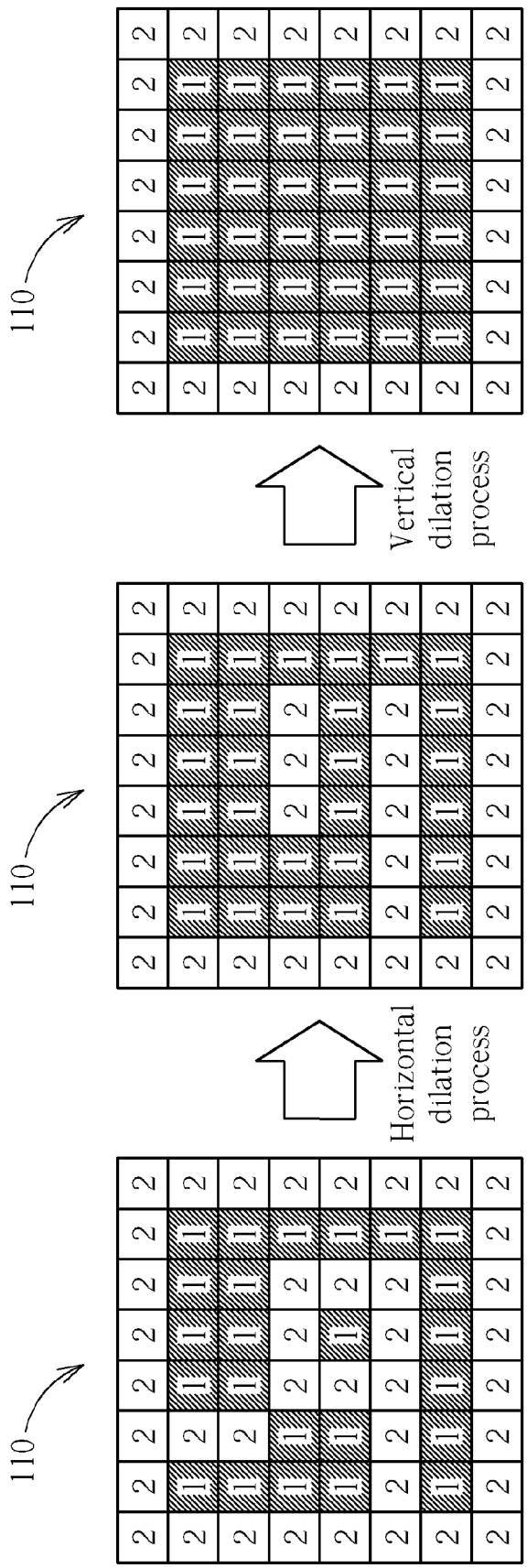
FIG. 4 is a diagram of performing a horizontal dilation process and a vertical dilation process sequentially to derive a reference table corresponding to a better foreground image.
Figure 5:
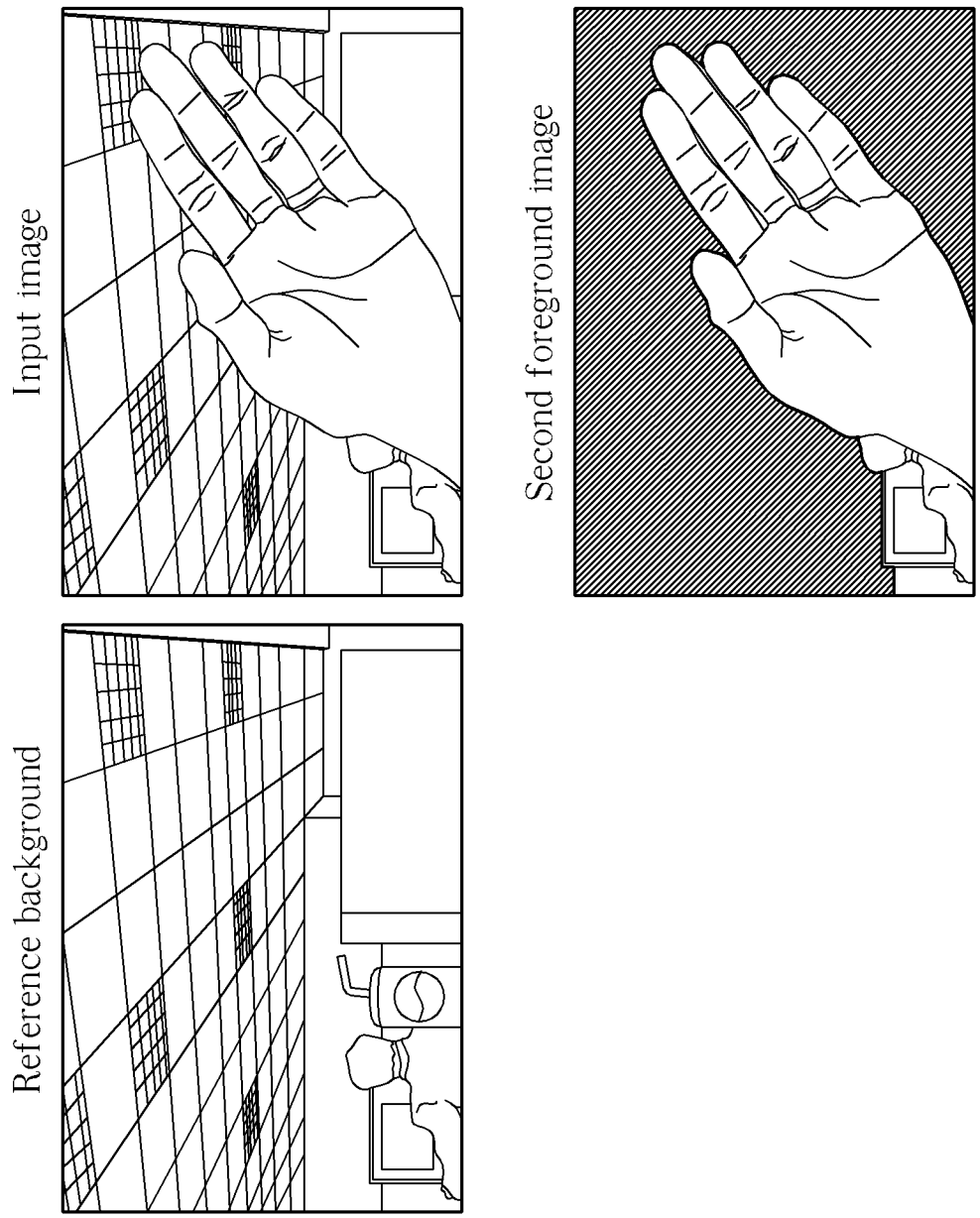
FIG. 5 is a diagram of a second foreground image and a corresponding input image derived according to an embodiment of the present invention.

For example, FIG. 4 illustrates an exemplary diagram of performing the horizontal dilation process and vertical dilation process sequentially to derive the reference table 110 corresponding to a better foreground image. In this example, the grid having a sign "1" within is a storage unit having the first code, hereinafter called a foreground grid; in addition, the grid having a sign "2" within is a storage unit having the second code, hereinafter called a background grid. On the horizontal direction of a background grid, when an amount of neighboring foreground grids, which are located at the left side of the background grid and distant from the background grid by a horizontal distance (the horizontal distance is equal to one processing unit), and an amount of neighboring foreground grids, which are located at the right side of the background and distant from the background grid by the horizontal distance, are both more than 1 (horizontal threshold is equal to 1 in this exemplary embodiment), the background grid is converted into a foreground grid having the sign "1" within; likewise, after processing the horizontal dilation processes for all the background grids, on the vertical direction of a background grid, when an amount of neighboring foreground grids located at the upper side of the background grid and distant from the background grid by a vertical distance (the vertical distance is equal to one processing unit), and an amount of neighboring foreground grids located at the lower side of the background and distant from the background grid by the vertical distance, are both more than 1 (vertical threshold is equal to 1 in this exemplary embodiment), the background grid is converted into a foreground grid having the sign "1" within. In this way, a foreground image which is not determined properly in step S201 can be accurately presented at this time, as shown by the result in FIG. 4. Please note that the aforementioned horizontal distance, vertical distance, horizontal threshold and vertical threshold can be modified according to different design considerations/requirements. For example, when a more loose dilation process is employed, the vertical distance and horizontal distance can be set as 3 processing units, and the vertical threshold and the horizontal threshold can be set as 1; in this way, a foreground with a high dilation extent can be derived. Please refer to FIG. 5, which is a diagram of a second foreground image FG_2 and a corresponding input image IMG_IN derived according to an embodiment of the present invention. Compared with the first foreground image FG_1 in FIG. 3, it can be seen that the aforementioned dilation process can derive a better foreground image.

Figure 6:
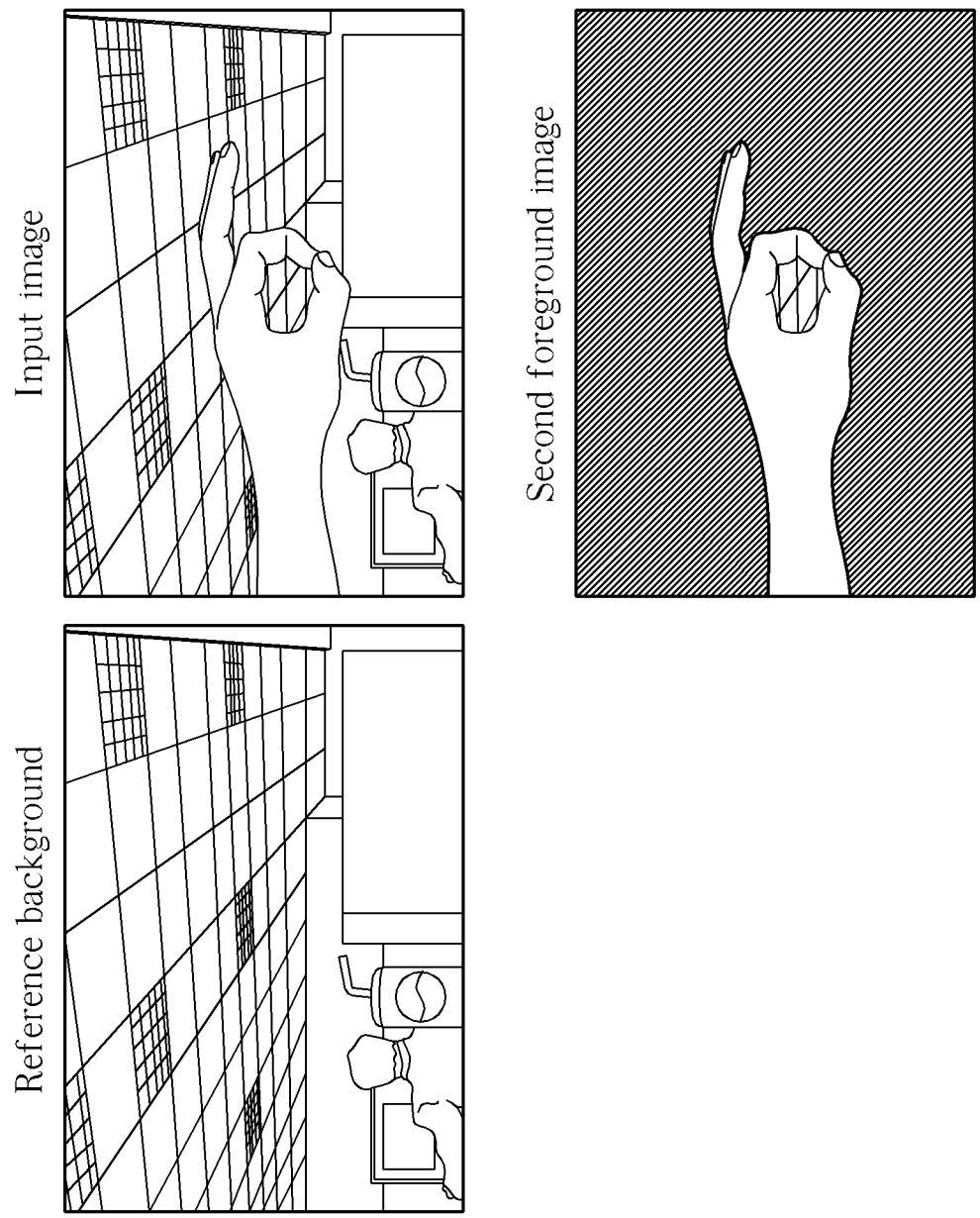
FIG. 6 is a diagram of a second foreground image, a corresponding input image and a reference background derived according to an embodiment of the present invention.
Figure 7:
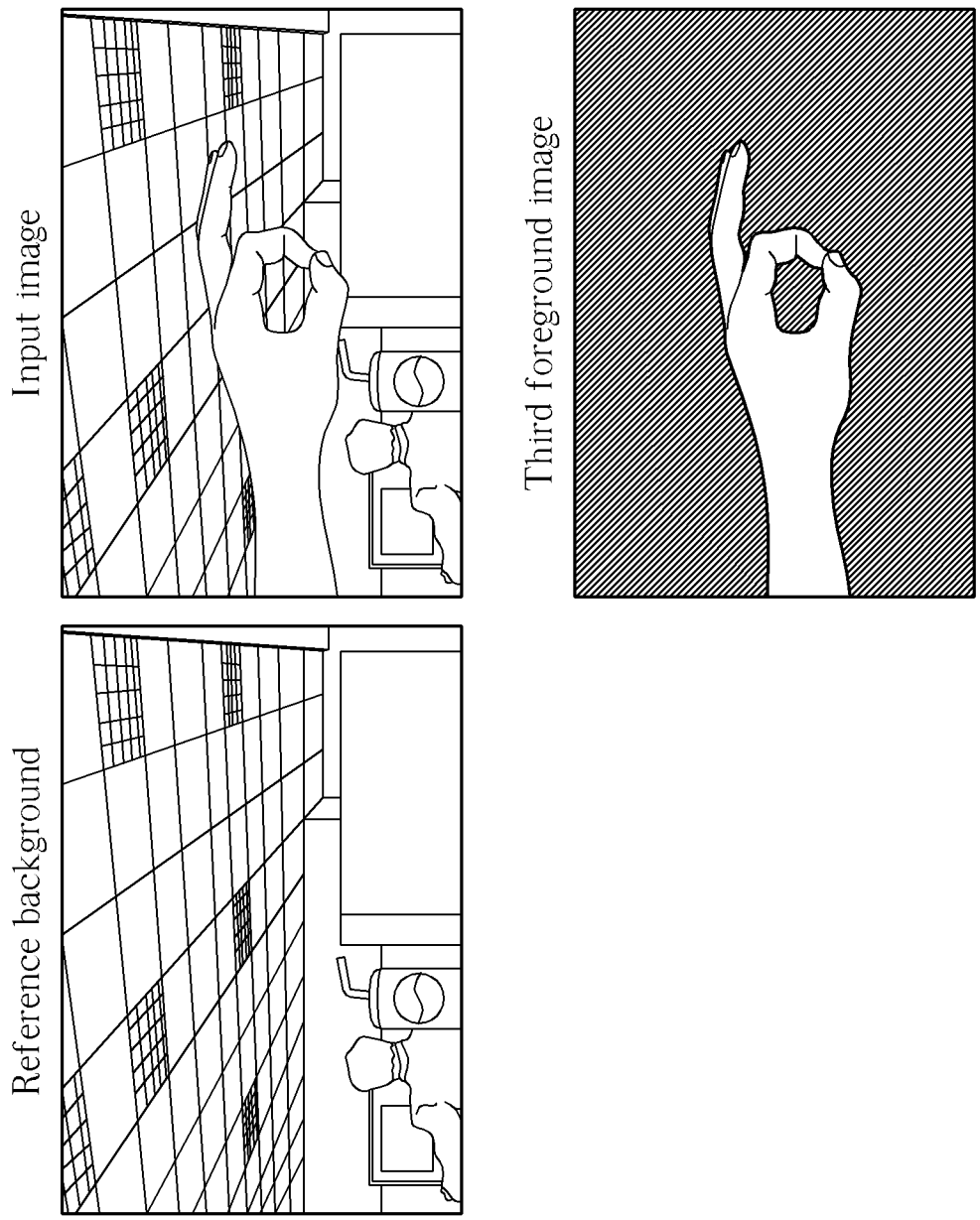
FIG. 7 is a diagram of a third foreground image and a corresponding input image according to an embodiment of the present invention.

The dilation process may sometimes result in a false foreground image. Please refer to FIG. 6, which is a diagram of a second foreground image FG_2, a corresponding input image IMG_IN and a reference background BG_REF derived according to an embodiment of the present invention. In the second foreground image FG_2 in FIG. 6, a background image, which is surrounded by a foreground image, is misjudged as a foreground image and derived via the foreground image dilation process, thereby leading to a false foreground image. To avoid this kind of foreground misjudgment, the foreground detecting module 105 compares the luminance values of all processing units of the second foreground image FG_2 with luminance values of all corresponding processing units of the reference background BG_REF again after receiving the second foreground image FG_2; if the difference between the luminance value of one processing unit of the second foreground image FG_2 and the luminance value of the corresponding processing unit of the reference background BG_REF is larger than or equal to a second threshold, the foreground detecting module 105 assigns the first code to a corresponding storage unit in the reference table 110; otherwise, the foreground detecting module 105 assigns the second code to a corresponding storage unit in the reference table 110 (step S209). Afterwards, the foreground detecting module 105 determines the third foreground image FG_3 according to each storage unit having the first code in the reference table 110 (step S211). In this embodiment, the second threshold is smaller than the first threshold. This is because the foreground capture unit 101 can derive a preliminary first foreground image FG_1 with a more stringent requirement, the foreground dilation unit 103 thereby derives foreground images which cannot fulfill the stringent requirement to derive the second foreground image FG_2, and the foreground detecting unit 105 then applies a more loose requirement to exclude images misjudged by the foreground dilation unit 103 while preserving foreground images properly derived. Please refer to FIG. 7, which is a diagram of a third foreground image FG_3 and a corresponding input image according to an embodiment of the present invention. Compared with the second foreground image FG_2 in FIG. 6, it can be seen that the aforementioned process can derive a better foreground image.

Figure 8:
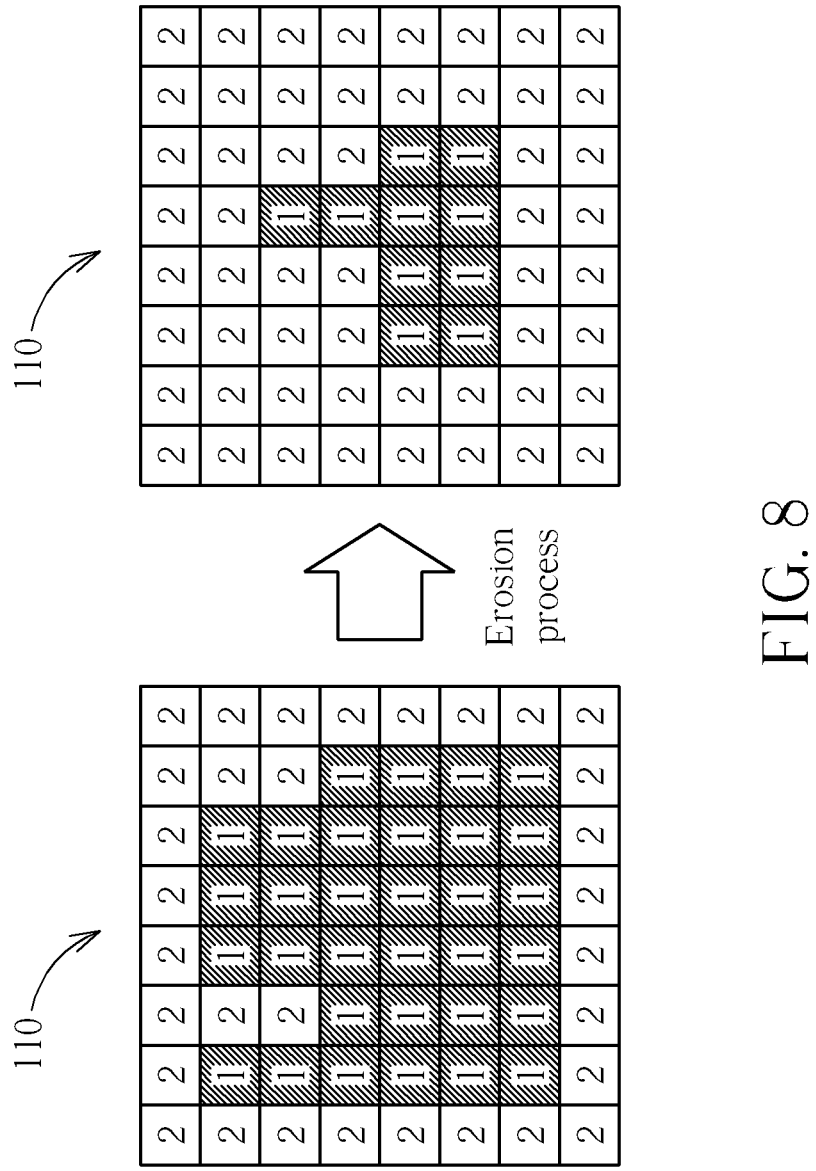
FIG. 8 is a diagram of performing an erosion process upon a reference table to derive an updated reference table corresponding to a better foreground image according to an embodiment of the present invention.
Figure 9:
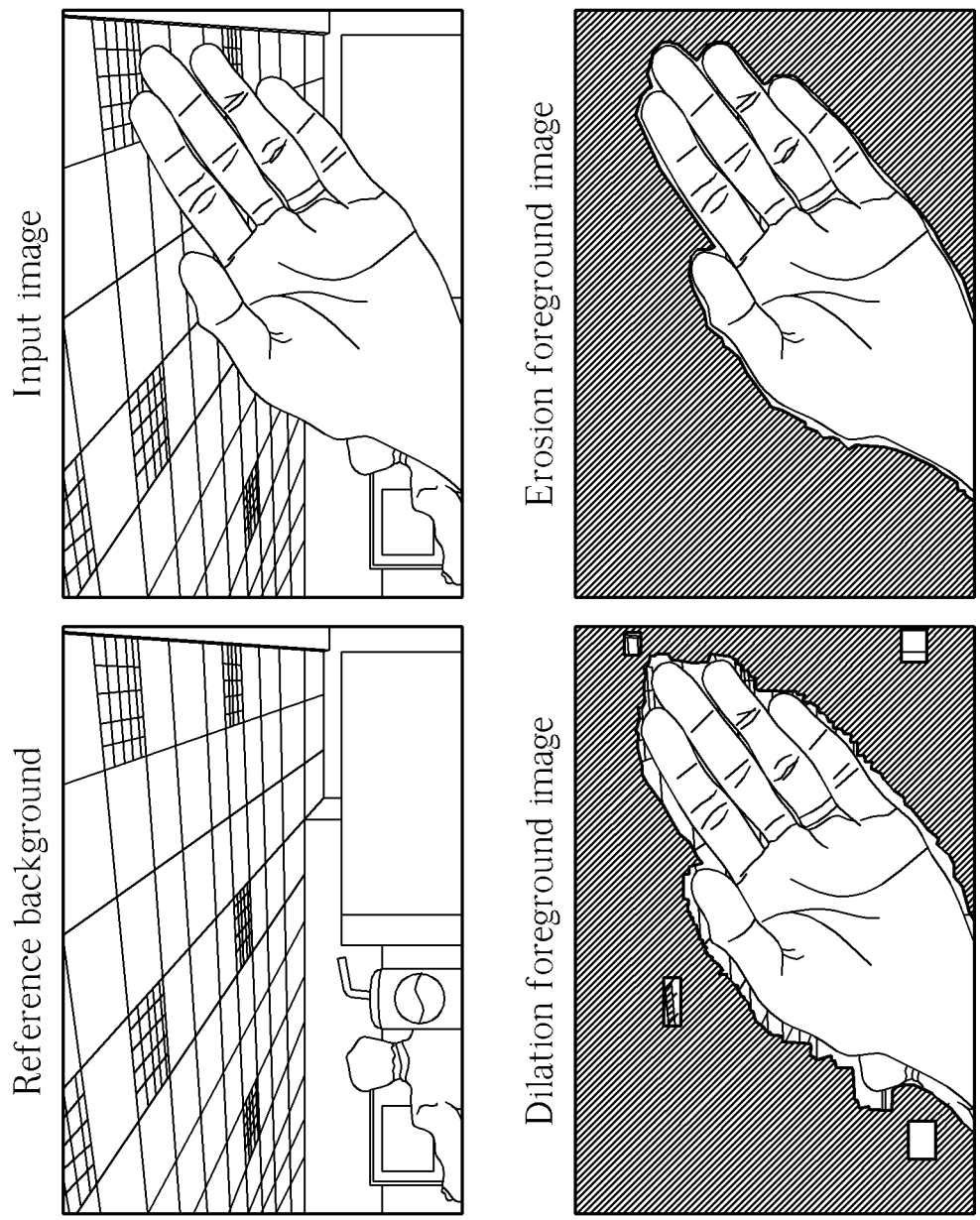
FIG. 9 is a diagram of a dilation foreground image, an erosion foreground image and a corresponding input image according to an embodiment of the present invention.

The present invention further employs the dilation and erosion unit 107 to perform a dilation and erosion process to derive a much better foreground image. The dilation unit 1071 in the dilation and erosion unit 107 performs a foreground dilation process to update the reference table 110 according to the reference table 110, thereby deriving a foreground dilation image (step S213). As the process thereof is similar to step S205, further description is omitted here fore brevity. Then, the erosion unit 1072 performs a foreground erosion process for each storage unit according to the reference table 101 updated by the dilation unit 1071, where the foreground erosion process includes: for a specific processing unit which corresponds to a specific storage unit and is located in the foreground dilation image, if the specific processing unit has an amount of neighboring processing units corresponding to the first code and distant from the specific processing unit by a predetermined distance that is less than an erosion threshold, the second code is assigned to the storage unit to replace the first code (step S215). For example, FIG. 8 illustrates that an updated reference table 110 corresponding to a better foreground image is derived from performing the erosion processing upon the reference table 110 according to an embodiment of the present invention. In this example, a grid having a sign "1" within is the storage unit having the first code, hereinafter called a foreground grid; and a grid having a sign "2" within is the storage unit having the second code, hereinafter called a background grid. For a specific foreground grid, when an amount of neighboring foreground grids, which are distant from the specific foreground grid by one processing unit (i.e., a predetermined distance equals to a processing unit in this exemplary embodiment) is less than 8 (i.e., an erosion threshold equals to 8 in this embodiment), the specific foreground grid is converted into a background grid having the sign "2" within. In this way, the background image which is not properly determined in step S215 can be presented accurately, as shown by the result in FIG. 9.

In addition, to derive a better foreground image, the dilation and erosion unit 107 will perform the dilation process and erosion process in the steps S213, S215 repeatedly and sequentially, until they have been performed for a predetermined number of times (step S217). Then, the dilation and erosion unit 107 will determine a fourth foreground image FG_4 according to the updated reference table 110 (step S219).

The present invention further provides a mechanism of removing a shadow part of at least one foreground object in an input image. Please refer to FIG. 10, which is a diagram of a shadow removal module 200 for removing a shadow part of a foreground object in the input image according to the present invention. The shadow removal module 200 includes a shadow detecting unit 201, an internal shadow dilation unit 202, a shadow dilation and erosion unit 203 and a reference table 210, where internal components of the shadow removal module 100 can be implemented via physical circuits (hardware), program codes (software) or a combination thereof, and any image processing structure adopting an algorithm for removing a shadow part of a foreground object in an input image according to the present invention falls within the scope of the present invention. The shadow detecting unit 201 is for receiving a foreground image FG corresponding to the input image, detecting a shadow part of at least one foreground object to generate a detection result according to a reference background BG_REF and determining a first foreground image FG_1 of the input image according to the detection result. The internal shadow dilation unit 202 is coupled to the shadow detection unit 201, and is for receiving the first foreground image FG_1 and adjusting it to be a second foreground image FG_2. The shadow dilation and erosion unit 203 includes a shadow dilation unit 2031 and a shadow erosion unit 2032, and is for receiving the second foreground image FG_2 and determining whether to output the processing result of the shadow erosion unit 2032 to be a third foreground image FG_3. The shadow dilation unit 2031 is coupled to the shadow detection unit 201 for receiving a foreground image and adjusting it to be a shadow dilation image, and the shadow erosion unit 2032 is coupled to the shadow dilation unit 2031 for receiving the shadow dilation image and adjusting it to be a shadow erosion image. The reference table 210 includes a plurality of storage units corresponding to a plurality of processing units of the input image (also corresponding to a plurality of processing units of the reference background BG_REF), and each storage unit is for storing a first code indicative of a foreground or a second code indicative of a non-foreground.

Figure 10:
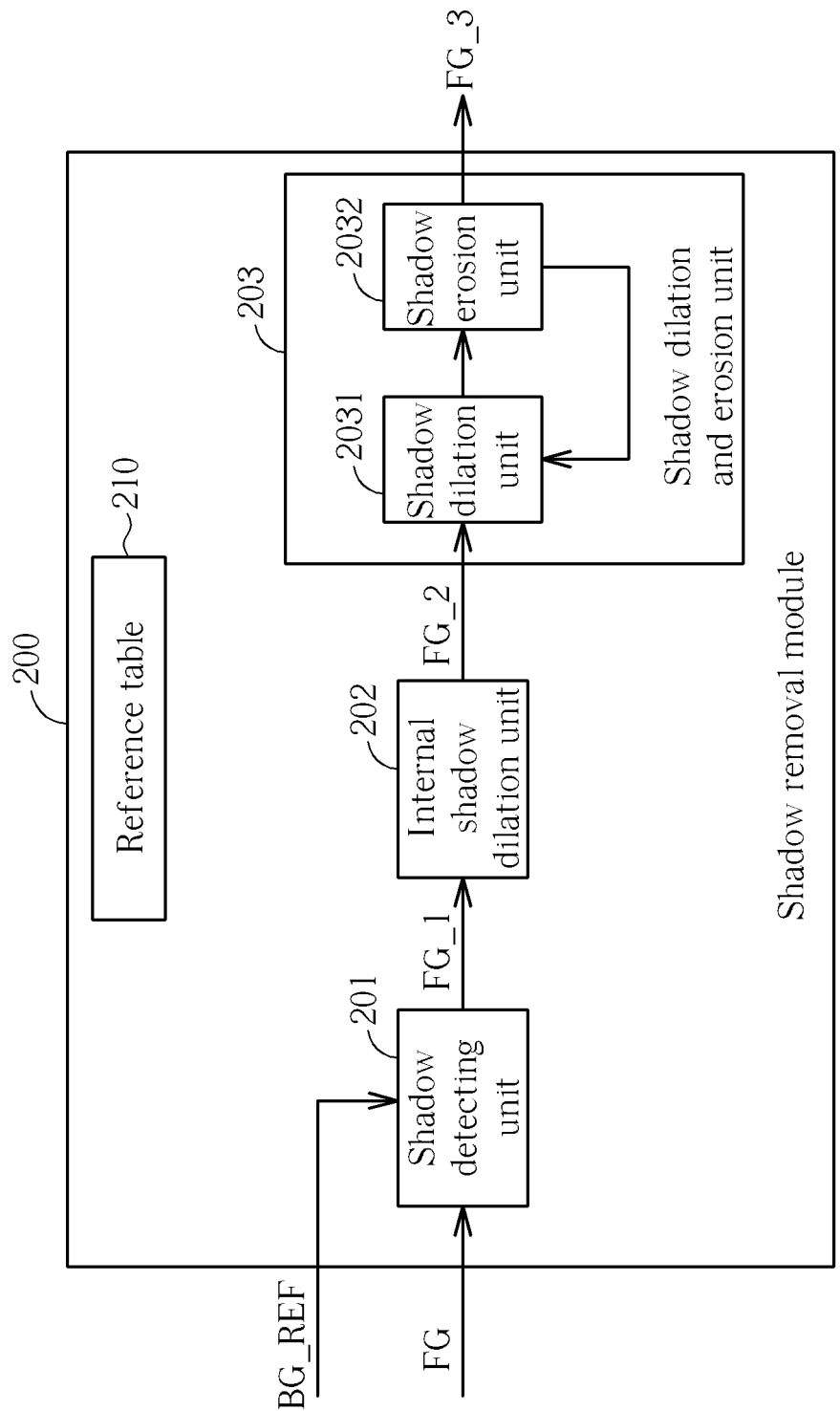
FIG. 10 is a diagram of a shadow removal module for removing a shadow part of a foreground object in the input image according to the present invention.
Figure 11:
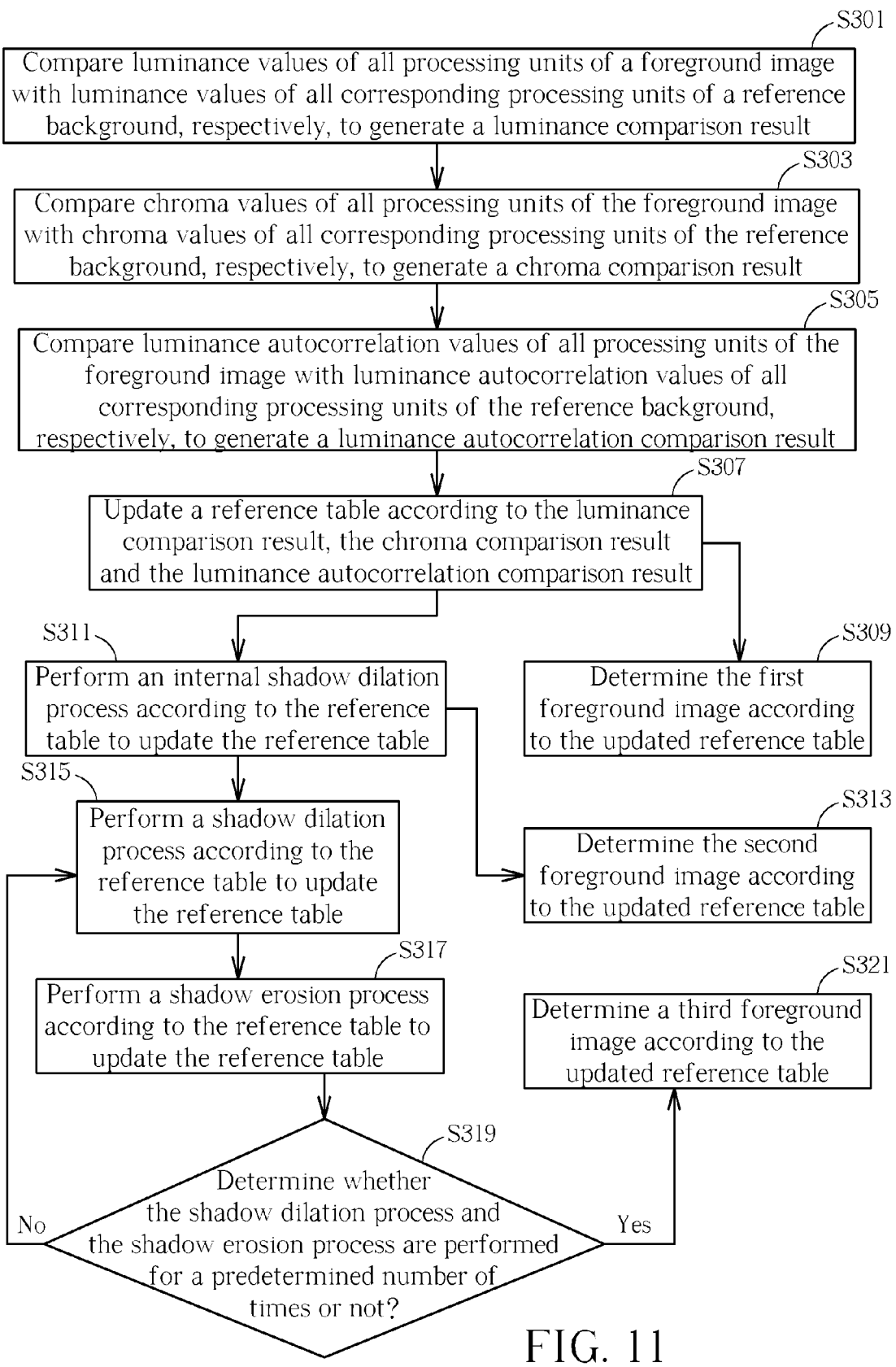
FIG. 11 is a flowchart of removing a shadow from a foreground image of an input image according to an embodiment of the present invention.

Please refer to FIG. 11 in conjunction with FIG. 10. FIG. 11 is a flowchart of removing a shadow from a foreground image of an input image according to an embodiment of the present invention. If the result is substantially the same, the steps are not required to be executed in the exact order shown in FIG. 11. In addition, the steps in FIG. 11 are not required to be executed sequentially, i.e., other steps can be inserted in between. The steps of removing shadow are detailed as follows:

S301: Compare luminance values of all processing units of the foreground image FG with luminance values of all corresponding processing units of the reference background BG_REF, respectively, to generate a luminance comparison result;

S303: Compare chroma values of all processing units of the foreground image FG with chroma values of all corresponding processing units of the reference background BG_REF, respectively, to generate a chroma comparison result;

S305: Compare luminance autocorrelation values of all processing units of the foreground image FG with luminance autocorrelation values of all corresponding processing units of the reference background BG_REF, respectively, to generate a luminance autocorrelation comparison result;

S307: Update the reference table 210 according to the luminance comparison result, the chroma comparison result and the luminance autocorrelation comparison result;

S309: Determine the first foreground image FG_1 according to the updated reference table 210;

S311: Perform an internal shadow dilation process according to the reference table 210 to update the reference table 210;

S313: Determine the second foreground image FG_2 according to the updated reference table 210;

S315: Perform a shadow dilation process according to the reference table 210 to update the reference table 210;

S317: Perform a shadow erosion process according to the reference table 210 to update the reference table 210;

S319: Determine whether the shadow dilation process and the shadow erosion process are performed for a predetermined number of times or not. If those processes are performed for the predetermined number of times, go to step S319; otherwise, go back to step S313; and S321: Determine a third foreground image FG_3 according to the updated reference table 210.

When a shadow of a foreground object falls within a part of a background image, the part of the background image resembles one where the foreground object is absent (i.e., that part of the background image of the reference background BG_REF) on luminance, chroma and texture (i.e., luminance autocorrelation) to some extent. Therefore, the shadow detecting unit 201 will determine the shadow part according to the luminance, chroma and luminance autocorrelation after receiving the foreground image FG. To save on processing time, the aforementioned steps are executed based on processing units each composed of a plurality of pixels. First of all, for each processing unit in the foreground image FG (i.e. each processing unit corresponding to a storage unit having the second code indicative of a non-foreground in the reference table 210), the shadow detecting unit 201 compares the luminance value of the processing unit in the foreground image FG and the luminance value of the corresponding processing unit in the reference background BG_REF to determine whether the luminance value of the processing unit in the foreground image FG is less than the luminance value of the corresponding processing unit in the reference background BG_REF (step S301). Next, the shadow detecting unit 201 compares the chroma value of each pixel of the processing unit in the foreground image FG with the chroma value of the corresponding pixel of the corresponding processing unit in the reference background BG_REF to determine whether the amount of pixels of the processing unit, which have chroma values different from chroma values of corresponding pixels of the reference background by respective difference values each being smaller than a chroma threshold, is larger than a shadow threshold (step S303). After that, the shadow detecting unit 201 generates a plurality of first luminance autocorrelation values according to the luminance values of all pixels of the processing unit and the neighboring processing units thereof, and generates a plurality of second luminance autocorrelation values according to the luminance values of all pixels of the corresponding processing unit and the neighboring processing units thereof of the reference background BG_REF. The shadow detecting unit 201 thereby determines whether an amount of first luminance autocorrelation values having the same value as the second luminance autocorrelation values of the corresponding pixel is larger than a shadow threshold (step S305). After completing the aforementioned three processes, the shadow detecting unit 201 thereby updates the reference table 210 according to the luminance comparison result, the chroma comparison result and the luminance autocorrelation comparison result (step 307).

Figure 12:
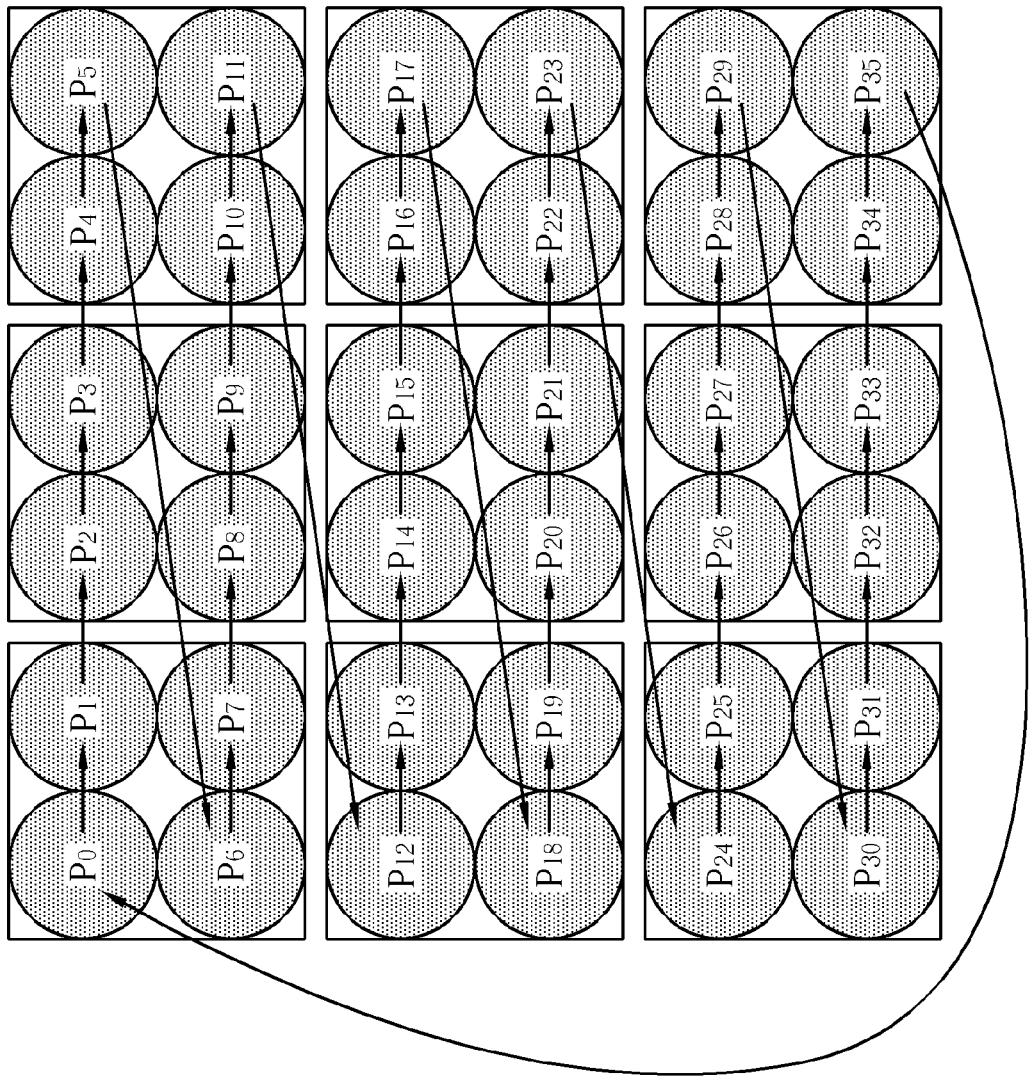
FIG. 12 is a diagram of generating a plurality of luminance autocorrelation values with luminance values of all pixels of a processing unit and neighboring processing units according to one embodiment of the present invention.
Figure 14:
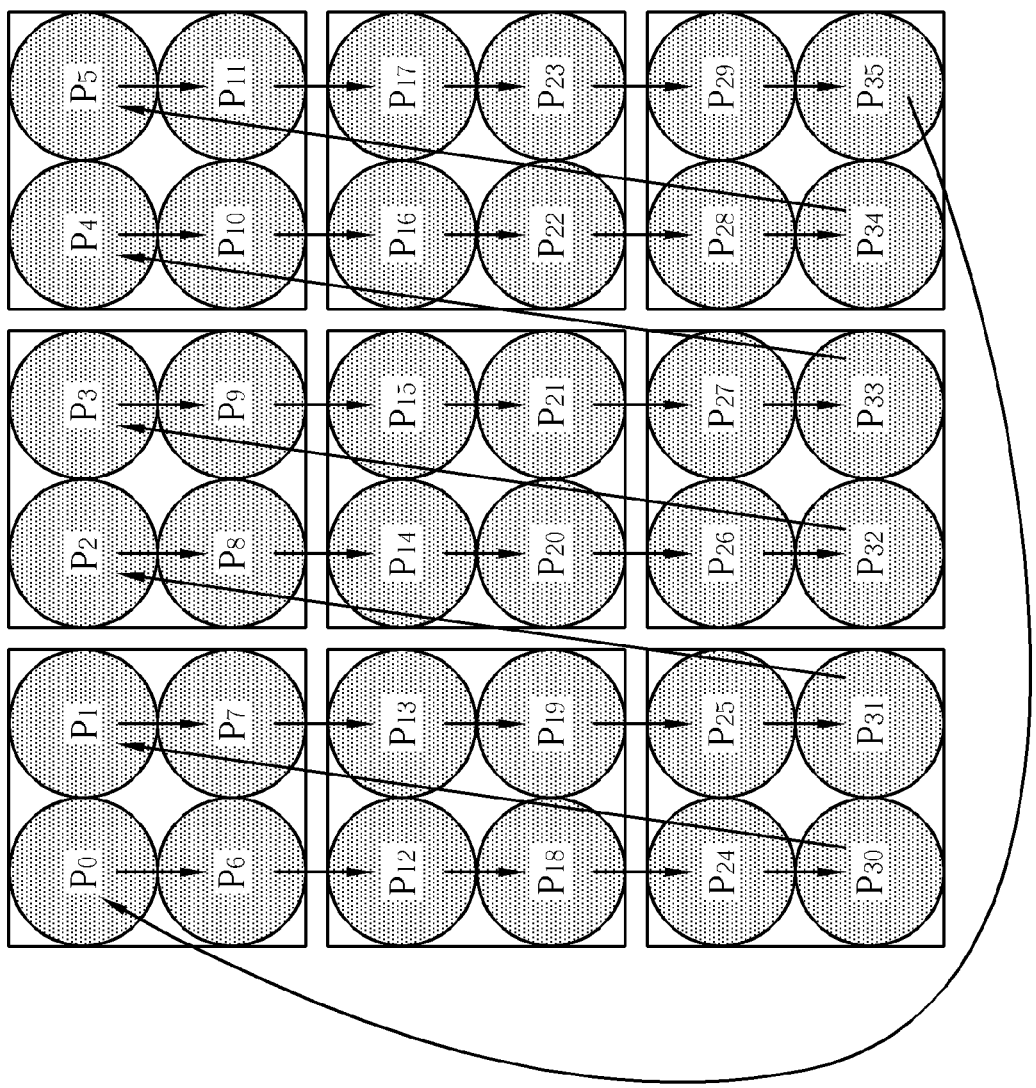
FIG. 14 is a diagram of generating a plurality of luminance autocorrelation values with luminance values of all pixels of a processing unit and neighboring processing units according to another embodiment of the present invention.

Please refer to FIG. 12 and FIG. 13 for further illustration of the operation of deriving the luminance autocorrelation values in step S305. To derive a more detailed luminance autocorrelation value (texture), in one embodiment of the present invention, one processing unit is chosen as a center and all the neighboring processing units distant from the processing unit by less than one processing unit are selected for computation. Assuming each processing unit includes 4 pixels, the computation here thereby includes luminance values of 36 pixels. FIG. 12 is a diagram of one embodiment of the present invention for generating a plurality of luminance autocorrelation values according to luminance values of all pixels of a processing unit and neighboring processing units, and FIG. 13 is a diagram illustrating luminance autocorrelation values generated according to the luminance values of all pixels in FIG. 12. In FIG. 12, each grid represents a processing unit, each circle represents a pixel, and each pixel has a luminance value $P_n$ and a luminance autocorrelation value $A_n$, wherein n=0~35. In the example of FIG. 13, a luminance autocorrelation value is defined to indicate whether a luminance value $P_n$ of a pixel exceeds or equals a luminance value $P_{n+1}$ of a neighboring pixel; that is, when $P_{n+1} \geq P_n$, $A_n = 1$; and when $P_{n+1} < P_n$, $A_n = -1$. It should be noted that the luminance autocorrelation value $A_{35}$ of the last pixel is determined by $P_{35}$ and $P_0$, where when $P_0 \geq P_{35}$, $A_n = 1$, and when $P_0 < P_{35}$, $A_n = -1$. Finally, a matrix of luminance autocorrelation values $A_n$ can be derived from the computations above, as shown in FIG. 13. Please note that the computation process of the luminance autocorrelation values $A_n$ in FIG. 12 is only one exemplary implementation. The luminance autocorrelation values $A_n$ can also be derived from other computation methods as long as the computation results set as the luminance autocorrelation values are capable of indicating the luminance difference between neighboring pixels. For example, FIG. 14 illustrates a diagram of another embodiment of the present invention for generating a plurality of luminance autocorrelation values according to luminance values of all pixels of a processing unit and neighboring processing units.

In step S305, the shadow detecting unit 201, with the help of the aforementioned computation of luminance autocorrelation values, processes each processing unit in the foreground image FG and a corresponding processing unit in the reference back ground BG_REF, thereby deriving matrixes of first luminance autocorrelation values (e.g., $B_n$) and second luminance autocorrelation values (e.g., $C_n$), respectively. Since these two matrixes are composed of 1 and −1, when a first luminance autocorrelation value $B_n$ and a corresponding second luminance autocorrelation value $C_n$ have the same sign, $B_n * C_n = 1$; otherwise, when a first luminance autocorrelation value $B_n$ and a corresponding second luminance autocorrelation value $C_n$ have different signs, $B_n * C_n = -1$. The greater the number of $B_n$ and $C_n$ that have the same sign, the more similar are the processing unit in the foreground image FG and the corresponding processing unit in the reference background REF_BG. Therefore, in a practical implementation, the shadow detecting unit 201 determines whether the processing unit belongs to the shadow part by checking if $\Sigma B_n * C_n$ is larger than a shadow threshold.

After comparing the luminance values, the chroma values and the luminance autocorrelation values, the shadow detecting unit 201 will determine whether each processing unit in the foreground image FG belongs to the shadow part according to the comparison results. If the shadow detecting unit 201 determines that the processing unit belongs to the shadow part, the shadow detecting unit 201 updates the reference table 210 by assigning the second code indicative of a non-foreground to a storage unit corresponding to the processing unit to replace the first code stored in the storage unit (step S307). The shadow detecting unit 201 thereby determines the first foreground image FG_1 according to each storage unit having the first code in the reference table 210 (step S309).

Next, the internal shadow dilation unit 202 performs an internal shadow dilation process for each storage unit according to the reference table 210, where if a specific processing unit of the first foreground image FG_1, which corresponds to a specific storage unit, has an amount of neighboring processing units corresponding to the second code and located at the left side of the specific processing unit within a horizontal distance and an amount of neighboring processing units corresponding to the second code and located at the right side of the specific processing unit within the horizontal distance that are both greater than a shadow horizontal threshold, the second code is assigned to the specific storage unit to replace the first code; and after the shadow horizontal dilation process is performed upon every storage unit, if a specific processing unit of the first foreground image FG_1, which corresponds to a specific storage unit, has an amount of neighboring processing units corresponding to the second code and located at the upper side of the specific processing unit within a vertical distance and an amount of neighboring processing units corresponding to the second code and located at the lower side of the specific processing unit within the vertical distance that are both greater than a shadow vertical threshold, the second code is assigned to the specific storage unit to replace the first code (step S311). The internal shadow dilation unit 202 thereby determines a second foreground image FG_2 according to each storage unit having the first code indicative of a foreground in the updated reference table 210 (step S313). Please note that the sequence of the shadow horizontal dilation process and the shadow vertical dilation process is not limited to the exemplary order mentioned above. An alternative design of performing the shadow vertical dilation process first and then performing the shadow horizontal dilation process later also falls within the scope of the present invention.

The present invention further utilizes the shadow dilation and erosion unit 203 to perform a dilation/erosion process to derive a much better foreground image. The shadow dilation unit 2031 in the shadow dilation and erosion unit 203 performs a shadow dilation process according to the reference table 210 to update the reference table 210 for deriving a shadow dilation image (step S315). As the process thereof is similar to step S311, further description is omitted here. Next, the shadow erosion unit 2032 in the shadow dilation and erosion unit 203 performs a shadow erosion process according to the reference table 210 updated by the shadow dilation unit 2031, wherein the shadow erosion process includes: for a specific processing unit which corresponds to a specific storage unit and is located in the shadow dilation image, if the specific processing unit has an amount of neighboring processing units corresponding to the second code and distant from the specific processing unit within a predetermined distance that is less than a shadow erosion threshold, assigning the first code indicative of a foreground to the storage unit to replace the second code originally stored therein (step S317). The shadow dilation and erosion unit 203 will perform the shadow dilation process and shadow erosion process in steps S315, S317 repeatedly and sequentially, until those processes are performed for a predetermined number of times (step S319). Next, the shadow dilation and erosion unit 203 determines a third foreground image FG_3 according to the updated reference table 210.

Figure 15:
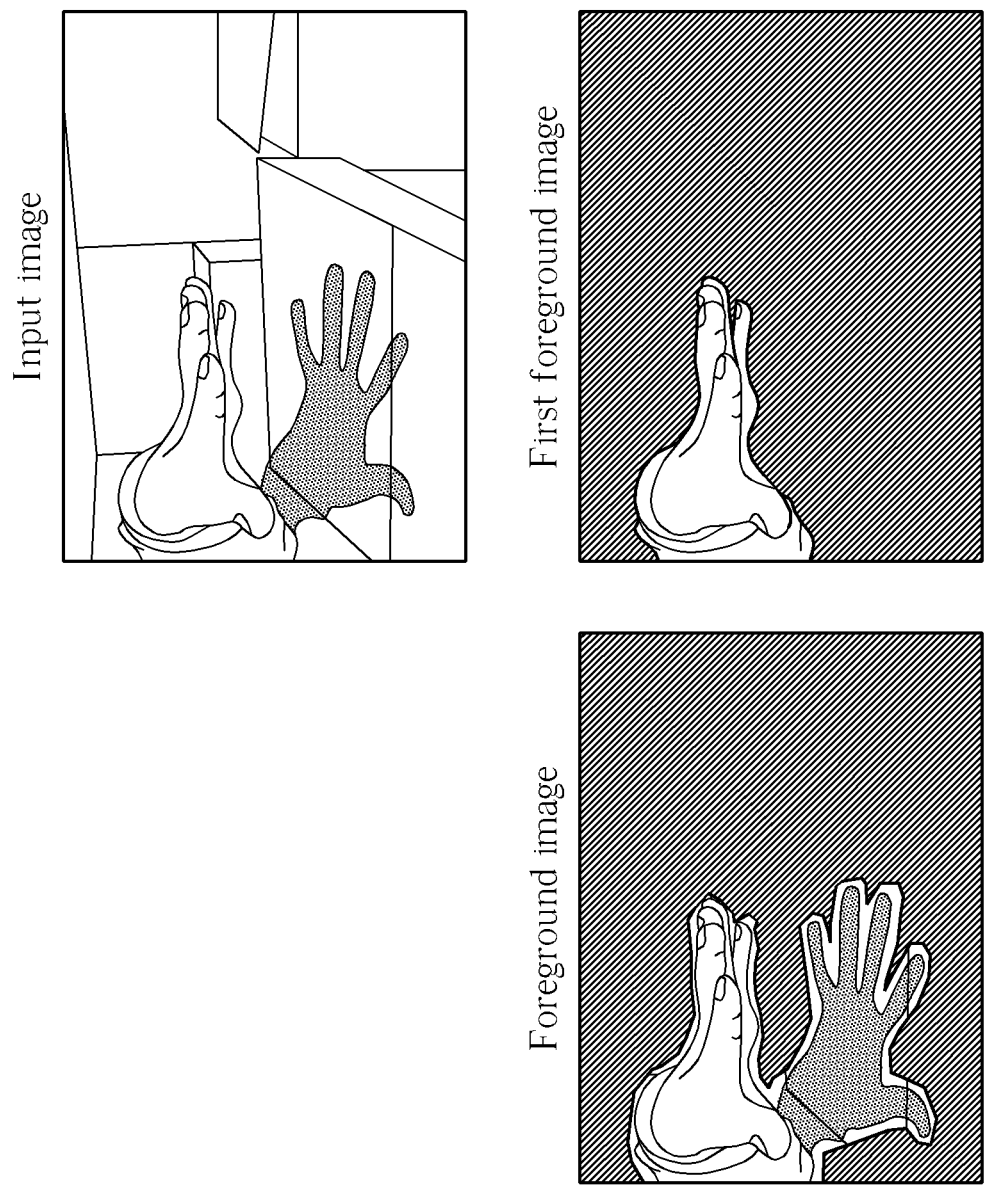
FIG. 15 is a diagram of a first foreground image, a corresponding reference background and a foreground image according to an embodiment of the present invention.

Please refer to FIG. 15, which is a diagram of a first foreground image FG_1, a corresponding reference background BG_REF and a foreground image FG according to an embodiment of the present invention. It can be seen from the figure that the aforementioned steps can properly remove a shadow part of a foreground object from a foreground image.

In addition, the present invention further provides a mechanism to perform an edge shaping upon a foreground image. Please refer to FIG. 16, which is a diagram of an edge shaping module 300 for performing an edge shaping upon a foreground image according to an embodiment of the present invention. The edge shaping module 300 includes an edge detecting unit 301, an edge pixel detecting unit 302, an edge shaping unit 303 and a reference table 310, wherein internal components of the edge shaping module 300 can be implemented via physical circuits (hardware), program codes (software) or a combination thereof, and any image processing structure adopting the algorithm for edge shaping of a foreground object in an input image according to the present invention falls within the scope of the present invention. The edge detecting unit 301 is for receiving a foreground image FG corresponding to an input image and detecting an edge of at least a foreground object in the foreground image FG to generate a first detection result (which corresponds to a first foreground image FG_1). The edge pixel detecting unit 302 is coupled to the edge detecting unit 301, and is for detecting an edge of at least a foreground object in the foreground image FG to generate a second detection result (which corresponds to a second foreground image) according to the first detection result. The edge shaping unit 303 is coupled to the edge pixel detecting unit 302 and is for performing an edge shaping process upon the second foreground image FG_2 to output a third foreground image FG_3 according to the second detection result. In addition, please note that, based on the design considerations/requirements, the edge shaping module 300 can directly output the second foreground image FG_2 generated by the edge pixel detecting unit 302, or output the third foreground image FG_3 processed by the edge shaping unit 303. The reference table 310 includes a plurality of storage units corresponding to a plurality of processing units in the input image, respectively, where each processing unit includes a plurality of pixels, and each storage unit is for storing a first code indicative of a foreground, a second code indicative of a non-edge foreground or a third code indicative of a background edge.

Figure 16:
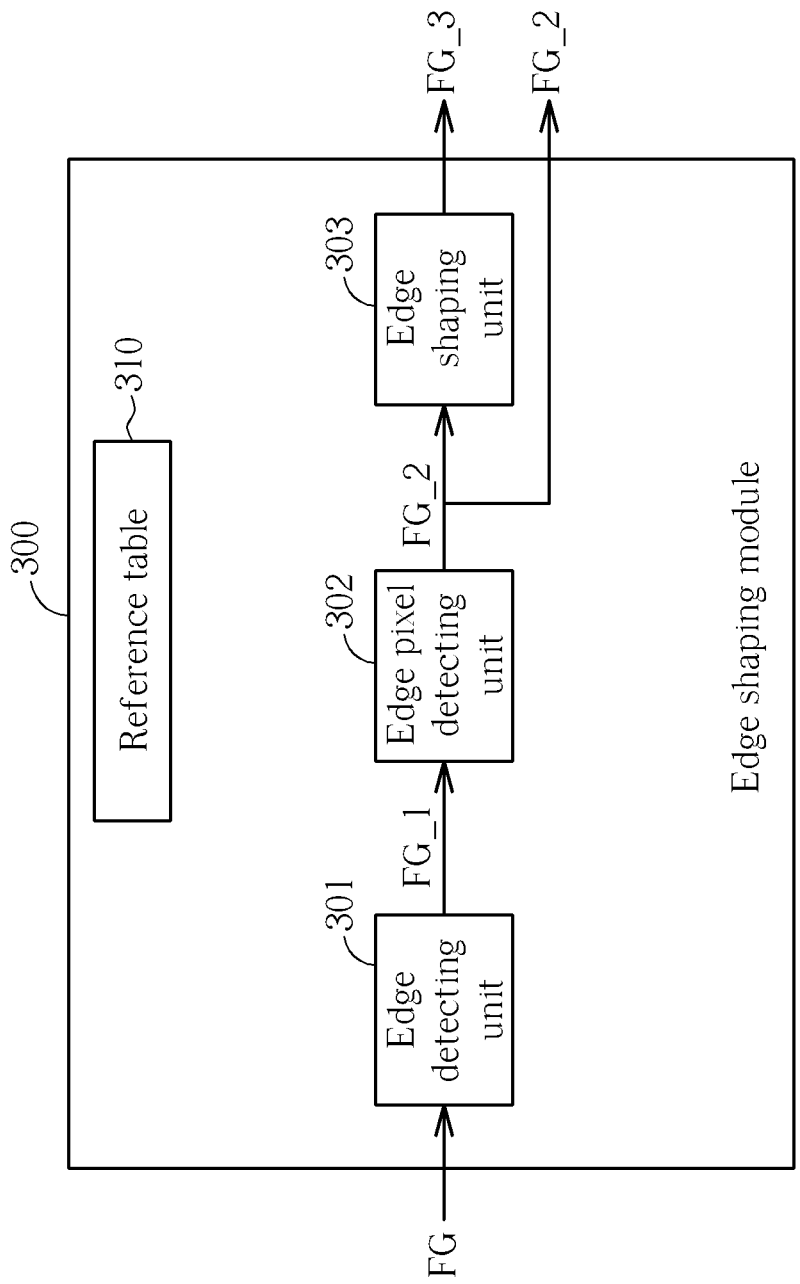
FIG. 16 is a diagram of an edge shaping module for performing an edge shaping for a foreground image according to an embodiment of the present invention.
Figure 17:
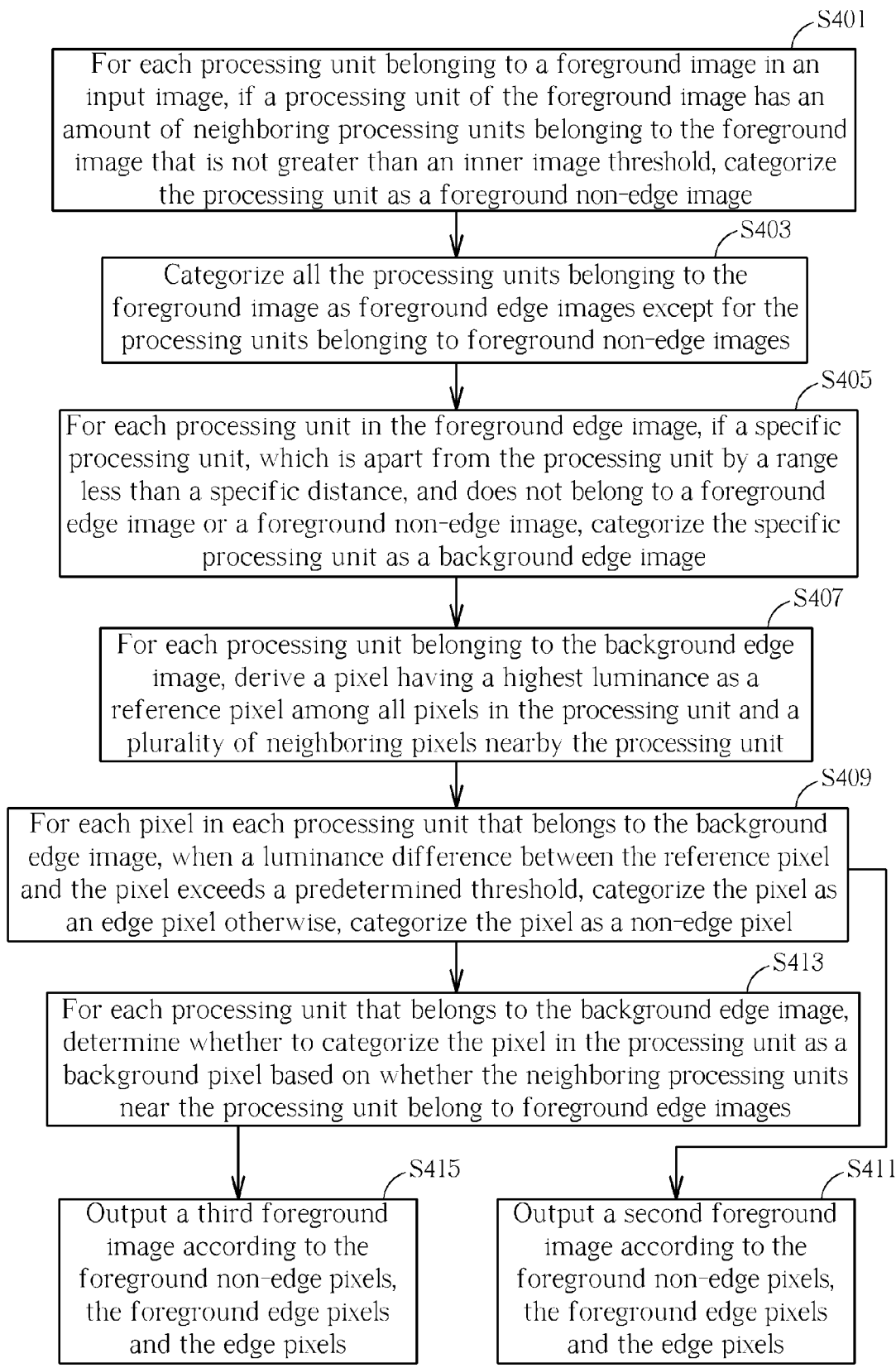
FIG. 17 is a flowchart of deriving a foreground from an input image according to an embodiment of the present invention.

Please refer to FIG. 17 in conjunction with FIG. 16. FIG. 17 is a flowchart of deriving a foreground from an input image according to an embodiment of the present invention. If the result is substantially the same, the steps are not required to be executed in the exact order shown in FIG. 17. In addition, the steps in FIG. 17 are not required to be executed sequentially, i.e., other steps can be inserted in between. The steps of edge shaping are detailed as follows:

S401: For each processing unit belonging to a foreground image in an input image, if the processing unit of the foreground image has an amount of neighboring processing units belonging to the foreground image that is not greater than an inner image threshold, categorize the processing unit as a foreground non-edge image;

S403: Categorize all the processing units belonging to the foreground image as foreground edge images except for the processing units belonging to foreground non-edge images;

S405: For each processing unit in the foreground edge image, if a specific processing unit, which is apart from the processing unit by a range less than a specific distance, and does not belong to a foreground edge image or a foreground non-edge image, categorize the specific processing unit as a background edge image;

S407: For each processing unit belonging to the background edge image, derive a pixel having a highest luminance as a reference pixel among all pixels in the processing unit and a plurality of neighboring pixels nearby the processing unit;

S409: For each pixel in each processing unit that belongs to the background edge image, when a luminance difference between the reference pixel and the pixel exceeds a predetermined threshold, categorize the pixel as an edge pixel; otherwise, categorize the pixel as a non-edge pixel;

S411: Output a second foreground image FG_2 according to the foreground non-edge pixels, the foreground edge pixels and the edge pixels;

S413: For each processing unit that belongs to the background edge image, determine whether to categorize the pixel in the processing unit as a background pixel based on whether the neighboring processing units near the processing unit belong to foreground edge images;

S415: Output a third foreground image FG_3 according to the foreground non-edge pixels, the foreground edge pixels and the edge pixels The edge detecting unit 301 performs an erosion process to derive non-edge parts in the foreground image FG after receiving the foreground image FG corresponding to an input image, where the erosion process includes: for each processing unit belonging to a foreground image FG (i.e. a processing unit corresponding to a storage unit having the first code stored therein) in an input image, if the processing unit of the foreground image, which corresponds to the storage unit, has an amount of neighboring processing units corresponding to the first code that is not greater than an inner image threshold, assigning the second code indicative of a non-edge foreground to the storage unit to replace the first code (step S401). In this way, after the edge detecting unit 301 rules out all the processing units belonging to non-edge foreground images, the other foreground images can be derived as foreground edge images, meanwhile, all the processing units belonging to the foreground edge image will correspond to storage units each having the first code stored therein, and all the foreground non-edge images will correspond to storage units each having the second code (step S403).

To further illustrate the aforementioned erosion process, please refer to the function below in conjunction with FIG. 18:

$$\beta(A) = A - (A \text{ Erosed by } B) \quad (1)$$

Figure 18:
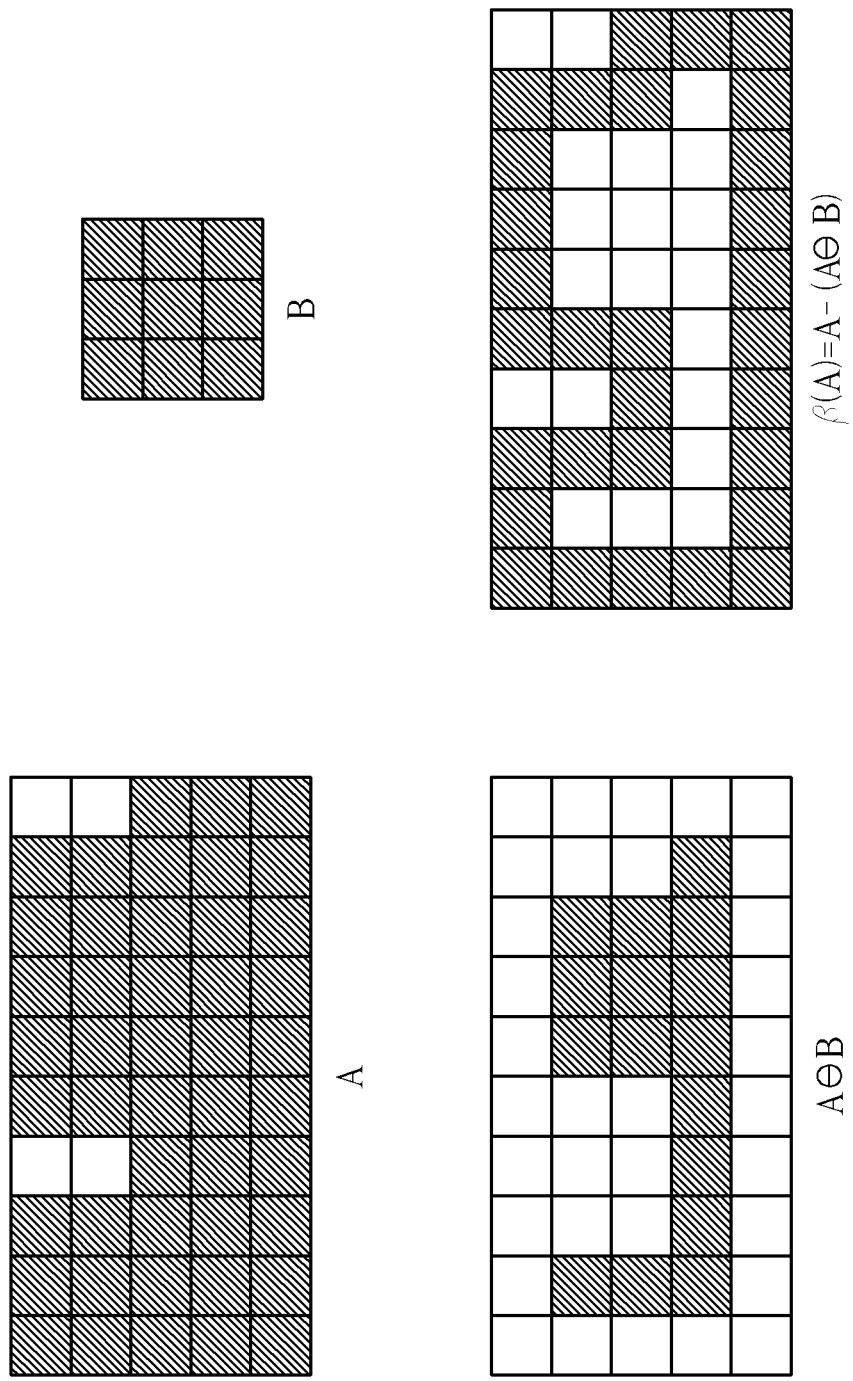
FIG. 18 is a diagram of an image erosion process according to an embodiment of the present invention.

In FIG. 18, the slash part in an input image is a foreground image A, and B is a mask for erosion purposes. The erosion process first applies the mask B on each processing unit (i.e., each grid). When there is a processing unit in the mask B that does not belong to a foreground image, the erosion process categorizes the central processing unit of the mask B as a non-foreground unit (i.e., the blank grind shown in the figure), and then an eroded foreground image AΘB can be derived (i.e., the operation of step S401). Next, an edge image β(A) can be derived after ruling out the eroded foreground image AΘB from the foreground image A (i.e., the operation of step S403).

Next, the edge detecting unit 301 is operative to process each processing unit belonging to the foreground edge image. Assuming that the processing unit is set as a center, when a specific processing unit within a specific range (e.g., another processing unit right next to the processing unit) does not belong to a foreground edge image or foreground non-edge image, the specific processing unit is categorized as a background edge image and the third code indicative of a background edge is assigned to a storage unit corresponding to the specific processing unit (step S405). Step S405 is for deriving processing units of background just outside the foreground edge such that the following pixel level processing can be facilitated. Next, for each pixel belonging to the background edge image (i.e., each processing unit corresponding to a storage unit having a third code stored therein), the edge pixel detecting unit 302 will derive a pixel having the highest luminance among neighboring pixels within a range of one pixel as a reference pixel (step S407). In addition, for each pixel belonging to the background edge image, the edge pixel detecting unit 302 compares a luminance of each pixel and the luminance of the reference pixel. When a luminance difference between the reference pixel and the pixel exceeds a predetermined threshold, the edge pixel detecting unit 302 categorizes the pixel as an edge pixel and assigns an edge code to the pixel; when the luminance difference between the reference pixel and the pixel does not exceed the predetermined threshold, the edge pixel detecting unit 302 categorizes the pixel as a non-edge pixel and assigns a non-edge code to the pixel (step S409). The edge pixel detecting unit 302 thereby outputs the second foreground image FG_2 according to the foreground non-edge images, the foreground edge images and the edge pixels (step S411).

The steps S407 and S409 are for deriving pixels belonging to an edge of the foreground object in the background image. Since pixels belonging to edges usually have a lower luminance than normal pixels, step S407 thereby derives the brightest pixel (i.e., the pixel which is closest to the non-background pixel) among pixels of the processing itself and pixels of neighboring processing units (i.e., pixels that do not belong to the processing unit but are apart from the processing unit by a specific range, for example, the pixels surrounding the boundary of the processing unit) to compare with other pixels. When a luminance difference between a specific pixel in the processing unit and the reference pixel is too large, it implies that the specific pixel has a little possibility of being a non-background pixel; when a luminance difference between a specific pixel in the processing unit and the reference pixel is small, it implies that the specific pixel has a very high possibility of being a non-background pixel.

Figure 19:
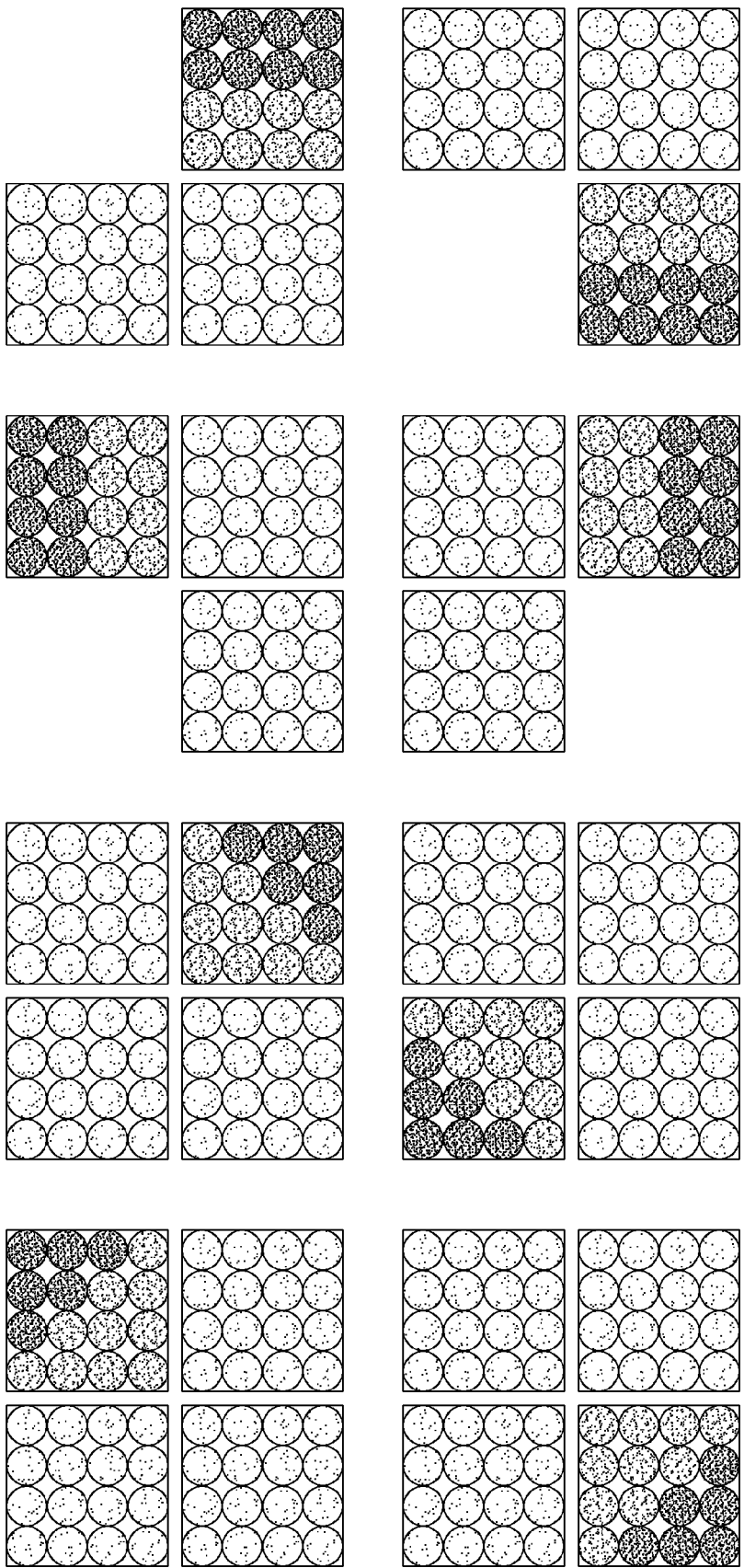
FIG. 19 is a diagram of an edge shaping process according to an embodiment of the present invention.
Figure 20:
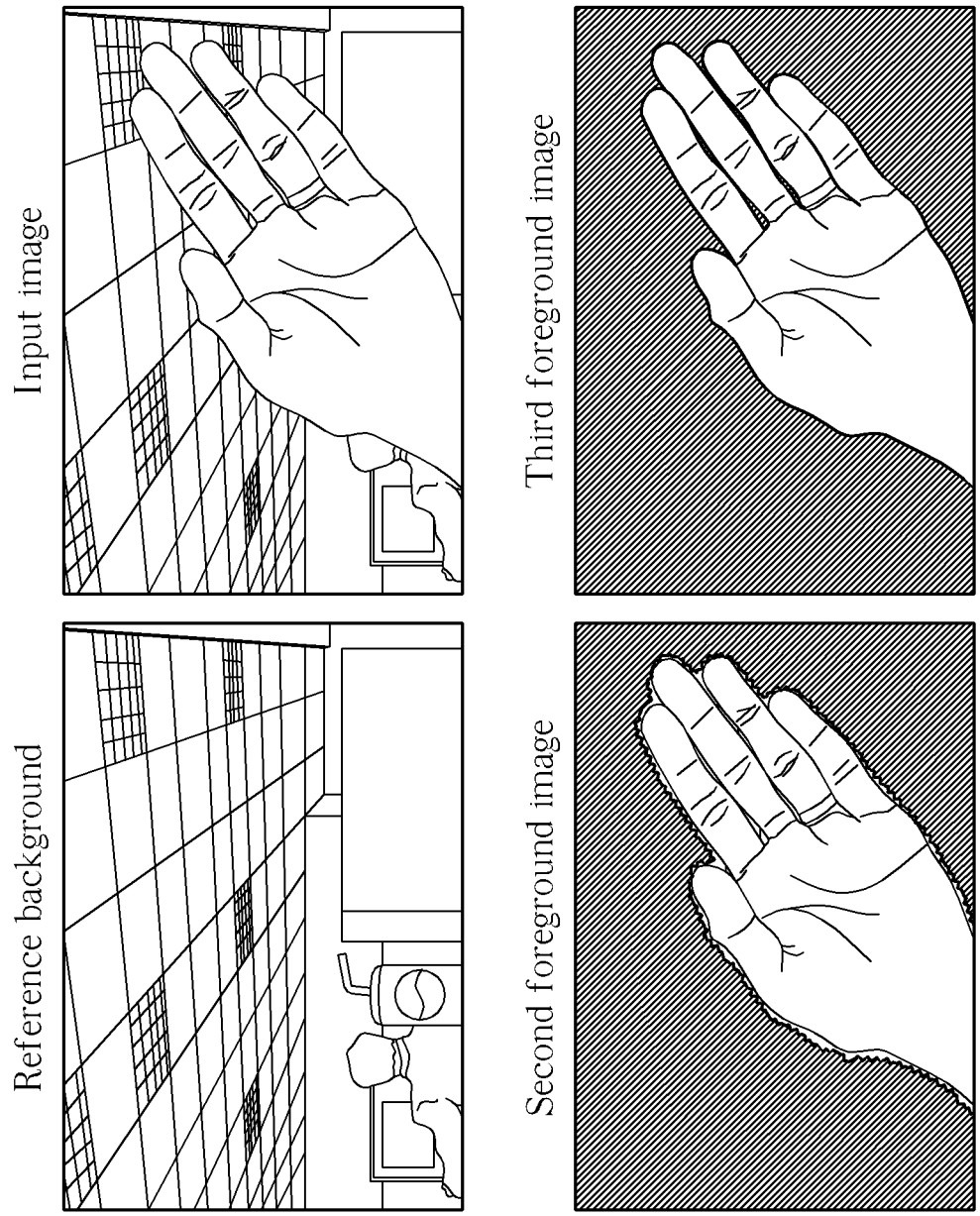
FIG. 20 is a diagram of a second foreground image, a third foreground image, and a corresponding input image according to an embodiment of the present invention.

For each processing unit that belongs to the background edge image (i.e., each processing unit which corresponds to a storage having the third code), the edge shaping unit 303, after deriving the preliminary second foreground image FG_2, will determine whether to categorize the pixel in the processing unit as a background pixel based on whether the neighboring processing units near the processing unit belong to foreground edge images (step S413). Finally, the edge shaping unit 303 outputs a third foreground image according to the foreground non-edge images, the foreground edge images and the edge pixels (step S415). For an illustration of this, please refer to FIG. 19, which is a diagram of an edge shaping process according to an embodiment of the present invention, wherein the dark circle indicates a background pixel, a circle with a slash indicates an edge pixel or an non-edge pixel, and a blank circle indicates a pixel of a processing unit of a background edge image. As shown in the figure, the edge shaping unit 303 will categorize those pixels which are more distant from the processing unit of a foreground edge image as background pixels; however, other pixels which are more close to the processing unit of a foreground edge image remain the same. In this way, the eventually outputted image will become more smooth. Please refer to FIG. 20, which is a diagram of the second foreground image FG_2, the third foreground image FG_3, and the corresponding input image IMG_IN according to an embodiment of the present invention. Referring to a comparison result of the second foreground image FG_2 and the third foreground image FG_3, it can be readily known that the aforementioned edge shaping process can properly derive a better foreground image.

Please note that the aforementioned three image processing methods can be utilized independently or implemented together, depending upon actual application requirements. For example, when a foreground image with a best visual performance is expected, all three image processing methods can be adopted simultaneously to derive a foreground image with shadow removal and smooth visual effects at the edge. In other words, the fourth foreground image FG_4, generated based on the flow shown in FIG. 2 by the foreground generating module 100 shown in FIG. 1, can be utilized as the foreground image FG processed by the shadow removal module 200 in FIG. 10 and the flow shown in FIG. 11, the third foreground image FG_3, generated based on the flow shown in FIG. 11 by the shadow removal module 200 shown in FIG. 10, can be utilized as the foreground image FG processed by the edge shaping module 300 in FIG. 16 and the flow shown in FIG. 17, and the third foreground image FG_3 generated based on the flow shown in FIG. 17 by the edge shaping module 300 shown in FIG. 16 is the foreground image with best visual performance.

To summarize, in one embodiment, the present invention provides an image processing method which is capable of removing a background to derive an image of at least one foreground object; in another embodiment, the present invention further removes a shadow part of a foreground object of an image (e.g., the aforementioned image with its background removed); and in yet another embodiment, the present invention further applies an edge shaping upon an image (e.g., the aforementioned image with the shadow part of the foreground object removed) to derive a better foreground image.

Those skilled in the art will readily observe that numerous modifications and alterations of the device and method may be made while retaining the teachings of the invention.

What is claimed is:

1. An image processing method, comprising:
   receiving an input image;
   referring to a first threshold to compare a reference background and the input image to determine a first foreground image within the input image;
   determining a second foreground image, which is within the input image and different from the first foreground image, according to the first foreground image; and
   referring to a second threshold different from the first threshold to compare the reference ground and the second foreground image to determine a third foreground image within the input image;
   wherein the input image comprises a plurality of processing units corresponding to a plurality of processing units of the reference background, respectively, each processing unit comprises a plurality of pixels, and the image processing method further comprises:
   building a reference table for recording a result of comparing the reference background and the input image and a result of comparing the reference ground and the second foreground image, wherein the reference table comprises a plurality of storage units corresponding to the plurality of processing units of the input image, respectively, and each storage unit is for storing a first code indicative of a foreground or a second code indicative of a background;
   wherein the step of determining the third foreground image according to the second foreground image and the reference ground comprises:
   comparing luminance values of all processing units of the second foreground image with luminance values of all corresponding processing units of the reference background, respectively;
   for each processing unit of the second foreground image:
   if a difference between a luminance value of the processing unit of the second foreground image and a luminance value of a corresponding processing unit of the reference background is larger than or equal to the second threshold, maintaining the first code stored in a corresponding storage unit in the reference table; and
   if the difference between the luminance value of the processing unit of the second foreground image and the luminance value of the corresponding processing unit of the reference background is smaller than the second threshold, assigning the second code to the corresponding storage unit in the reference table to replace the first code; and
   determining the third foreground image according to each storage unit having the first code in the reference table.

2. The image processing method of claim 1, wherein the step of determining the first foreground image according to the input image and the reference ground comprises: comparing luminance values of all processing units of the input image with luminance values of all corresponding processing units of the reference background, respectively; for each processing unit of the input image: if a difference between a luminance value of the processing unit of the input image and a luminance value of a corresponding processing unit of the reference background is larger than or equal to the first threshold, assigning the first code to a corresponding storage unit in the reference table; and if the difference between the luminance value of the processing unit of the input image and the luminance value of the corresponding processing unit of the reference background is smaller than the first threshold, assigning the second code to the corresponding storage unit in the reference table; and determining the first foreground image according to each storage unit having the first code in the reference table.

3. The image processing method of claim 1, wherein the step of determining the second foreground image within the input image and different from the first foreground image according to the first foreground image comprises: for each storage unit having the second code in the reference table: if a specific processing unit of the first foreground image, which corresponds to the storage unit, has an amount of neighboring processing units corresponding to the first code and located at a left side of the specific processing unit within a horizontal distance and an amount of neighboring processing units corresponding to the first code and located at a right side of the specific processing unit within the horizontal distance that are both greater than a horizontal threshold, assigning the first code to the storage unit to replace the second code; and determining the second foreground image according to each storage unit having the first code in the reference table.

4. The image processing method of claim 1, wherein the step of determining the second foreground image within the input image and different from the first foreground image according to the first foreground image comprises: for each storage unit having the second code in the reference table: if a specific processing unit of the first foreground image, which corresponds to the storage unit, has an amount of neighboring processing units corresponding to the first code and located at an upper side of the specific processing within a vertical distance and an amount of neighboring processing units corresponding to the first code and located at a lower side of the specific processing within the vertical distance that are both greater than a vertical threshold, assigning the first code to the storage unit to replace the second code; and determining the second foreground image according to each storage unit having the first code in the reference table.

5. The image processing method of claim 1, wherein the step of determining the fourth foreground image according to the third foreground image comprises: performing a horizontal dilation process, comprising: for each storage unit having the second code in the reference table: if a specific processing unit of the third foreground image, which corresponds to the storage unit having the second code, has an amount of neighboring processing units corresponding to the first code and located at a left side of the specific processing within a horizontal distance and an amount of neighboring processing units corresponding to the first code and located at a right side of the specific processing within the horizontal distance that are both greater than a horizontal threshold, assigning the first code to the storage unit to replace the second code; and determining the fourth foreground image according to each storage unit having the first code in the reference table.

6. The image processing method of claim 5, wherein the step of determining the fourth foreground image within the input image according to the third foreground image further comprises:
   performing an erosion process, comprising:
   for each storage unit having the first code in the reference table:
   if a specific processing unit of the third foreground image, which corresponds to the storage unit having the first code, has an amount of neighboring processing units, corresponding to the first code and located within a predetermined distance from the specific processing unit corresponding to the storage unit having the first code, that is less than an erosion threshold, assigning the second code to the storage unit to replace the first code.

7. The image processing method of claim 6, wherein the horizontal dilation process and the erosion process are performed repeatedly for a predetermined number of times.

8. The image processing method of claim 1, further comprising: determining a fourth foreground image within the input image according to the third foreground image, comprising: performing a vertical dilation process, comprising: for each storage unit having the second code in the reference table: if a specific processing unit of the third foreground image, which corresponds to the storage unit, has an amount of neighboring processing units corresponding to the first code and located at an upper side of the specific processing unit within a vertical distance and an amount of neighboring processing units corresponding to the first code and located at a lower side of the specific processing unit within the vertical distance that are both greater than a vertical threshold, assigning the first code to the storage unit to replace the second code; and determining the fourth foreground image according to each storage unit having the first code in the reference table.

9. The image processing method of claim 8, wherein the step of determining the fourth foreground image within the input image according to the third foreground image further comprises:

performing an erosion process, comprising:

for each storage unit having the first code in the reference table:

if the specific processing unit of the third foreground image, which corresponds to the storage unit having the first code, has an amount of neighboring processing units, corresponding to the first code and located within a predetermined distance from the specific processing unit corresponding to the storage unit having the first code that is less than an erosion threshold, assigning the second code to the storage unit to replace the first code.

10. The image processing method of claim 9, wherein the vertical dilation process and the erosion process are performed repeatedly for a predetermined number of times.

11. The image processing method of claim 1, wherein the reference background is a default image or a dynamically updated image.

* * * * *